United States Patent
Knapp et al.

(10) Patent No.: US 7,903,566 B2
(45) Date of Patent: Mar. 8, 2011

(54) METHODS AND SYSTEMS FOR ANOMALY DETECTION USING INTERNET PROTOCOL (IP) TRAFFIC CONVERSATION DATA

(75) Inventors: Stephen Knapp, Snoqualmie, WA (US); Timothy Mark Aldrich, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 12/195,333

(22) Filed: Aug. 20, 2008

(65) Prior Publication Data

US 2010/0046378 A1   Feb. 25, 2010

(51) Int. Cl.
*G06F 11/30* (2006.01)

(52) U.S. Cl. ........................................................ 370/242
(58) Field of Classification Search .................. 370/241, 370/242, 244, 380, 392
See application file for complete search history.

(56) References Cited

U.S. PATENT DOCUMENTS

| | | | |
|---|---|---|---|
| 5,278,901 A | 1/1994 | Shieh et al. | |
| 5,311,593 A | 5/1994 | Carmi | |
| 5,787,253 A | 7/1998 | McCreery et al. | |
| 6,279,113 B1 | 8/2001 | Vaidya | |
| 6,321,338 B1 * | 11/2001 | Porras et al. | 726/25 |
| 6,470,297 B1 | 10/2002 | Ford | |
| 6,499,107 B1 | 12/2002 | Gleichauf et al. | |
| 6,816,973 B1 | 11/2004 | Gleichauf et al. | |
| 6,873,797 B2 | 3/2005 | Chang et al. | |
| 6,910,003 B1 | 6/2005 | Arnold et al. | |
| 7,053,765 B1 | 5/2006 | Clark | |
| 7,127,739 B2 | 10/2006 | Syvanne | |
| 7,165,100 B2 | 1/2007 | Cranor et al. | |
| 7,174,566 B2 | 2/2007 | Yadav | |
| 7,180,856 B1 | 2/2007 | Breslau et al. | |
| 7,185,368 B2 * | 2/2007 | Copeland, III | 726/25 |
| 7,360,246 B2 | 4/2008 | Etoh et al. | |
| 7,543,052 B1 * | 6/2009 | Cesa Klein | 709/224 |
| 2002/0144156 A1 | 10/2002 | Copeland, III | |
| 2010/0046393 A1 * | 2/2010 | Knapp et al. | 370/253 |
| 2010/0050084 A1 * | 2/2010 | Knapp et al. | 715/736 |
| 2010/0050256 A1 * | 2/2010 | Knapp et al. | 726/22 |
| 2010/0050262 A1 * | 2/2010 | Knapp et al. | 726/25 |

OTHER PUBLICATIONS

Song et al, Flow-based Statistical Aggregation Schemes for Network Anomaly Detection, IEEE, 6 pages, 2006.*
Technology Profile Fact Sheet: Network Anomaly Detection Algorithm; http://www.nsa.gov/techtrans/techt00029.cfm; 2 pages.
Tanase, M.; One of These Things is not Like the Others: The State of Anomaly Detection; http://www. securityfocus.com/print/infocus/1600; Jul. 1, 2002; 5 pages.
Anomaly Detection for Computer Security; http://www.cs.unm/edu/~terran/research/anomaly_detection_for_computer_security; 2 pages.

(Continued)

*Primary Examiner* — Frank Duong
(74) *Attorney, Agent, or Firm* — Armstrong Teasdale LLP

(57) ABSTRACT

A computer-based method for detecting anomalies in the traffic passing through an internet protocol (IP) network is described. The method includes extracting, from a database, a single instance of each unique packet header associated with a plurality of IP-to-IP packets, the IP-to-IP packets having been transmitted across the IP network over a predefined period of time, analyzing the packet headers to identify anomalous conversations based on at least one of a conversation uniqueness, a time of week uniqueness, and a data quantity uniqueness, and providing alerts corresponding to detected anomalous conversations.

22 Claims, 16 Drawing Sheets

OTHER PUBLICATIONS

An Efficient Anomaly Detection Algorithm for Vector-Based Intrusion Detection Systems; http://www.springerlink.com/content/bmx1c58ndqp46hd8/; Sep. 6, 2005; 2 pages.

Cisco Learning Blog; http://blog.sazza.de/?cat=21; Apr. 23, 2008; 4 pages.

Packet Sniffer; http://en.wikipedia.org/wiki/Packet_sniffer; Aug. 19, 2008; 3 pages.

Pcap; http://en.wikipedia.org/wiki/Pcap; Aug. 14, 2008; 3 pages

TCP Connection Establishment Process: The "Three-Way Handshake"; http://www.tcpipguide.co/free/t_TCPCpnnectionEstablishmentProcessTheThreeWayHandsh-3.htm; 2005; 6 pages.

IP Protocol Suite; http://www.networksorcery.com/enp/topic/ipsuite.htm (IP, TCP, UDP); 47 pages.

OmniPeek Overview; http://www.wildpackets.com/products/omnipeek/overview/printable; 2008; 3 pages.

Lee, H, et al.; Multicast Routing Debugger (MRD)—A System to Monitor the Status of Multicast Network; http://www.pamconf.org/2002/Multicast_Routing_Debugger.pdf; Mar. 26, 2002; 9 pages.

Multicast; http://en.wikipedia.org/wiki/Multicast; Aug. 18, 2008; 4 pages.

United States Patent and Trademark Office, Office Action for U.S. Appl. No. 12/195,340, filed Apr. 13, 2010, 24 pages, US.

United States Patent and Trademark Office, Office Action for U.S. Appl. No. 12/195,340, filed Aug. 11, 2010, 23 pages, US.

\* cited by examiner

FIG. 7

Search Conversations

| Start Time: | now − 4 days |
| --- | --- |
| End Time: | now |
| VLAN ID: | |
| IP Protocol: | |
| IP 1: | 192.48.0.0/24 |
| IP 2: | |
| Port 1: | |

● Show Details  ◎ Show Summary

Find Conversation Data

Query returned 76 rows in 8.993 seconds

| First Packet | Last Packet | VLAN ID | IP 1 | IP 2 | IP Proto | Port | Num Bytes | Kbps | | Link to this data |
| --- | --- | --- | --- | --- | --- | --- | --- | --- | --- | --- |
| 2008-05-30 22:54:21.526696 | 2008-05-30 23:04:21.648472 | N/A | 24.17.211.64 | 192.48.0.164 | TCP | 22 | 5105 | 0.068 | GetHeaders | AddtoIntelLog |
| 2008-05-31 04:59:52.032161 | 2008-05-31 04:59:55.015421 | N/A | 76.74.100.145 | 192.48.0.160 | TCP | 22 | 156 | 0.416 | GetHeaders | AddtoIntelLog |
| 2008-05-31 04:59:52.032536 | 2008-05-31 05:10:53.183120 | N/A | 76.74.100.145 | 192.48.0.161 | TCP | 22 | 278598 | 3.372 | GetHeaders | AddtoIntelLog |
| 2008-05-31 04:59:52.032786 | 2008-05-31 04:59:55.016168 | N/A | 76.74.100.145 | 192.48.0.162 | TCP | 22 | 156 | 0.416 | GetHeaders | AddtoIntelLog |
| 2008-05-31 04:59:52.034160 | 2008-05-31 04:59:55.016918 | N/A | 76.74.100.145 | 192.48.0.163 | TCP | 22 | 156 | 0.416 | GetHeaders | AddtoIntelLog |
| 2008-05-31 04:59:52.034909 | 2008-05-31 05:05:20.942051 | N/A | 76.74.100.145 | 192.48.0.164 | TCP | 22 | 3602 | 0.088 | GetHeaders | AddtoIntelLog |
| 2008-05-31 04:59:52.035534 | 2008-05-31 04:59:55.017543 | N/A | 76.74.100.145 | 192.48.0.165 | TCP | 22 | 156 | 0.416 | GetHeaders | AddtoIntelLog |
| 2008-05-31 04:59:52.036908 | 2008-05-31 04:59:55.018292 | N/A | 76.74.100.145 | 192.48.0.166 | TCP | 22 | 156 | 0.416 | GetHeaders | AddtoIntelLog |
| 2008-05-31 04:59:52.037533 | 2008-05-31 04:59:55.019666 | N/A | 76.74.100.145 | 192.48.0.167 | TCP | 22 | 156 | 0.416 | GetHeaders | AddtoIntelLog |
| 2008-05-31 04:59:52.038657 | 2008-05-31 04:59:55.024163 | N/A | 76.74.100.145 | 192.48.0.168 | TCP | 22 | 156 | 0.416 | GetHeaders | AddtoIntelLog |
| 2008-05-31 04:59:52.039282 | 2008-05-31 04:59:55.018916 | N/A | 76.74.100.145 | 192.48.0.169 | TCP | 22 | 156 | 0.416 | GetHeaders | AddtoIntelLog |
| 2008-05-31 04:59:52.039782 | 2008-05-31 04:59:55.021040 | N/A | 76.74.100.145 | 192.48.0.170 | TCP | 22 | 156 | 0.416 | GetHeaders | AddtoIntelLog |
| 2008-05-31 04:59:52.040781 | 2008-05-31 04:59:55.020416 | N/A | 76.74.100.145 | 192.48.0.171 | TCP | 22 | 156 | 0.416 | GetHeaders | AddtoIntelLog |
| 2008-05-31 04:59:52.042905 | 2008-05-31 04:59:55.021790 | N/A | 76.74.100.145 | 192.48.0.172 | TCP | 22 | 156 | 0.416 | GetHeaders | AddtoIntelLog |
| 2008-05-31 04:59:52.043404 | 2008-05-31 04:59:55.023164 | N/A | 76.74.100.145 | 192.48.0.173 | TCP | 22 | 156 | 0.416 | GetHeaders | AddtoIntelLog |
| 2008-05-31 04:59:52.043779 | 2008-05-31 04:59:55.022539 | N/A | 76.74.100.145 | 192.48.0.174 | TCP | 22 | 156 | 0.416 | GetHeaders | AddtoIntelLog |
| 2008-05-31 04:59:52.044279 | 2008-05-31 04:59:55.025662 | N/A | 76.74.100.145 | 192.48.0.175 | TCP | 22 | 156 | 0.416 | GetHeaders | AddtoIntelLog |
| 2008-05-31 10:09:21.011810 | 2008-05-31 10:09:24.007061 | N/A | 117.21.127.165 | 192.48.0.166 | TCP | 22 | 156 | 0.416 | GetHeaders | AddtoIntelLog |
| 2008-05-31 10:09:21.012309 | 2008-05-31 10:09:24.008560 | N/A | 117.21.127.165 | 192.48.0.168 | TCP | 22 | 156 | 0.416 | GetHeaders | AddtoIntelLog |
| 2008-05-31 10:09:21.016808 | 2008-05-31 10:09:24.014930 | N/A | 117.21.127.165 | 192.48.0.162 | TCP | 22 | 156 | 0.416 | GetHeaders | AddtoIntelLog |
| 2008-05-31 10:09:21.018432 | 2008-05-31 10:23:05.338412 | N/A | 117.21.127.165 | 192.48.0.164 | TCP | 22 | 2162 | 0.021 | GetHeaders | AddtoIntelLog |
| 2008-05-31 10:09:21.019681 | 2008-05-31 10:09:24.018054 | N/A | 117.21.127.165 | 192.48.0.160 | TCP | 22 | 156 | 0.416 | GetHeaders | AddtoIntelLog |
| 2008-05-31 10:09:21.025177 | 2008-05-31 10:09:24.021802 | N/A | 117.21.127.165 | 192.48.0.170 | TCP | 22 | 156 | 0.416 | GetHeaders | AddtoIntelLog |
| 2008-05-31 10:09:21.025552 | 2008-05-31 10:09:24.022176 | N/A | 117.21.127.165 | 192.48.0.172 | TCP | 22 | 156 | 0.416 | GetHeaders | AddtoIntelLog |
| 2008-05-31 10:09:21.029300 | 2008-05-31 10:09:24.023551 | N/A | 117.21.127.165 | 192.48.0.174 | TCP | 22 | 156 | 0.416 | GetHeaders | AddtoIntelLog |
| 2008-05-31 10:09:21.052287 | 2008-05-31 10:30:36.720496 | N/A | 117.21.127.165 | 192.48.0.161 | TCP | 22 | 265591 | 1.666 | GetHeaders | AddtoIntelLog |
| 2008-05-31 10:09:21.052911 | 2008-05-31 10:09:24.047537 | N/A | 117.21.127.165 | 192.48.0.167 | TCP | 22 | 156 | 0.416 | GetHeaders | AddtoIntelLog |
| 2008-05-31 10:09:21.053535 | 2008-05-31 10:09:21.048162 | N/A | 117.21.127.165 | 192.48.0.169 | TCP | 22 | 156 | 0.416 | GetHeaders | AddtoIntelLog |

ScanTracker — 580

ScanTracker was designed to assist the security analyst in tracking an attacker throughout a network. It keeps track of everything that an attacker scans, and when an attacker finds open ports, it looks to see if that scanned host starts scanning too.
- This will search the scanner tracking database according to your search criteria
- The Type field specifies the type of packet returned by the 'Scanned' system (ie. Scanned sent a SYN/ACK back to the Scanner)
- Search fields will be logically ANDed together if they are supplied
- The query will return up to 1000 rows
- Time must be formatted as YYYY-MM-DD HH:MM:SS
- If Start Time is "now – 5 minutes", the query searches packets starting 5 minutes ago
- If End Time is "now – 5 minutes", the query searches the most recent packets in the database
- IPv4 and IPv6 addresses may be used

| | |
|---|---|
| 582 — Start Time: | 2008-06-05 19:05:00 |
| 583 — End Time: | 2008-06-05 19:05:03 |
| 584 — IP Protocol: | |
| 585 — Scanner: | 172.16.211.61 |
| 586 — Scanned: | |
| 587 — Port: | |
| 588 — Kilobytes: | > ___ KB |
| 589 — Type: | Any ▽ |
| 593 | Show Scan Data |

Query returned 11 rows in 0.005 seconds

| Date | Time | Scanner | Scanned | IP Proto | Port | Type | Activity | | | |
|---|---|---|---|---|---|---|---|---|---|---|
| | | 594 | 595 | 596 | 597 | 598 | 600 | 602 | 604 |
| 2008-06-05 | 19:05:00.061785 | 172.16.211.61 | 172.16.211.10 | TCP | 22 | SYN/ACK | 7 KB | Track Scanner | Track Scanned | GetHeaders |
| 2008-06-05 | 19:05:00.400318 | 172.16.211.61 | 172.16.211.10 | TCP | 22 | SYN/ACK | 7 KB | Track Scanner | Track Scanned | GetHeaders |
| 2008-06-05 | 19:05:00.740064 | 172.16.211.61 | 172.16.211.10 | TCP | 22 | SYN/ACK | 7 KB | Track Scanner | Track Scanned | GetHeaders |
| 2008-06-05 | 19:05:01.277951 | 172.16.211.61 | 172.16.211.10 | TCP | 3306 | SYN/ACK | 1 KB | Track Scanner | Track Scanned | GetHeaders |
| 2008-06-05 | 19:05:01.605775 | 172.16.211.61 | 172.16.211.10 | TCP | 22 | SYN/ACK | 7 KB | Track Scanner | Track Scanned | GetHeaders |
| 2008-06-05 | 19:05:01.816654 | 172.16.211.61 | 172.16.211.10 | TCP | 3306 | SYN/ACK | 1 KB | Track Scanner | Track Scanned | GetHeaders |
| 2008-06-05 | 19:05:01.927966 | 172.16.211.61 | 172.16.211.10 | TCP | 22 | SYN/ACK | 7 KB | Track Scanner | Track Scanned | GetHeaders |
| 2008-06-05 | 19:05:02.046747 | 172.16.211.61 | 172.16.211.10 | TCP | 22 | SYN/ACK | 7 KB | Track Scanner | Track Scanned | GetHeaders |
| 2008-06-05 | 19:05:02.424760 | 172.16.211.61 | 172.16.211.10 | TCP | 22 | SYN/ACK | 7 KB | Track Scanner | Track Scanned | GetHeaders |
| 2008-06-05 | 19:05:02.765383 | 172.16.211.61 | 172.16.211.10 | TCP | 22 | SYN/ACK | 7 KB | Track Scanner | Track Scanned | GetHeaders |
| 2008-06-05 | 19:05:02.774111 | 172.16.211.61 | 172.16.211.10 | TCP | 3306 | SYN/ACK | 2 KB | Track Scanner | Track Scanned | GetHeaders |

Observed Multicast Streams (last 15 minutes)

| MC Channel | Mbps |
|---|---|
| 239.0.1.145 | 0.001 |
| 239.32.6.1 | 19.622 |
| 239.32.10.50 | 0.337 |
| 239.34.2.10 | 0.002 |
| 239.34.2.100 | 1.097 |
| 239.40.134.6 | 4.171 |
| 239.250.1.1 | 0.001 |
| 239.255.250.251 | 0.000 |
| 239.255.255.250 | 0.001 |

METHODS AND SYSTEMS FOR ANOMALY DETECTION USING INTERNET PROTOCOL (IP) TRAFFIC CONVERSATION DATA

BACKGROUND OF THE INVENTION

The field of the invention relates generally to methods and systems that provide detailed information relating to the identification of security and networking issues on Internet Protocol (IP) networks, and more specifically, to the providing of network information for manual and/or automated network analysis through packet header collection and storage.

In an IP network there is significant danger of loss of information, loss of intellectual property, theft of corporate data, inappropriate connections, or permission access violations. Locating these types of activities in a complex and busy network is extremely difficult.

As is known in the art, IP network communication generally involves the transfer of packets of data from one address and port, to another. For example, when a user wants to connect to a website through a computer's internet browser, the user's computer sends a literal Transfer Control Protocol Synchronize (TCP SYN) packet to the website's computer IP address on port 80. The website's computer then acknowledges receipt of the SYN packet, a request to open communication, and responds with a Synchronize/Acknowledge (SYN/ACK) packet to establish connection with the user's computer. The user's computer receives this grant of request for communication and responds with an ACK packet indicating to the website computer that the transfer of data can begin.

In network management and security analysis there is a need to perform detailed analysis on these packets of data, and more specifically the packet headers, that are currently traversing the network. There is also a need to view the past traffic. This monitoring may be done utilizing packet header data. However, this monitoring has proved to be difficult because there may be billions of packets per day or more traversing the network. Therefore, it is unfeasible to simply store and analyze all the packet headers in a database without extensive hardware and analyst time expense.

At least one known program attempts to store mass quantities of packet header data, allotting a set number of bytes per captured packet regardless of the amount of memory needed (length of the packet header) for the data collected. Therefore, the size of the individual capture files can either be larger than necessary, or they may be insufficient and result in the truncation of valuable information. All of the captured packets are based on an optional predetermined filter requirement and are stored separately. Therefore, even a continuous string of like-kind packet headers are represented individually in a capture file, maintaining multiple entries of nearly identical information, utilizing valuable storage space and analysis time.

At least one known network monitoring tool performs network communication tracking. However, these monitoring tools only use subsets of data and generally perform off-line, one-time analysis instead of continuous on-line analysis. Additionally these tools only track individual TCP (connection oriented) or UDP (non-connection oriented) protocol sessions instead of all sessions in a specified time interval, and only a listing of which ports were in use is indicated. Each user connection is listed independently instead of grouping the connections based on linking conversing participants (a "conversation"). Also, in only listing the ports used, there is no determination of the actual service port being used between the participants.

As is known in the art, signature-based intrusion detection and scanner detection can identify suspicious activity while an attacker is either scanning a significant number of hosts/ports in the network or sending packets that have well known characteristics or signature matches. But if an attacker only sends a small number of packets to key hosts, and the packets do not contain strings that trigger signature-based intrusion detection systems, the existing detectors will not alert the analyst to the attacker's activity. The existing detectors do not identify patterns or anomalies in network behavior that indicate a potential attack.

When an attacker is penetrating a network, it is often difficult to know exactly what the attacker did during and after the penetration. Currently the method of acquiring this type of information is for the analyst to manually go back through the log files (or logged events) captured at the time of the attack if they are even available. Reviewing log files (or logged events) manually is time consuming, is prone to user error, and is difficult or impossible to perform in real-time.

At least one known network system hosts multicast video and audio streams between various sites around the country. However, in this network system there is no capability to automatically and passively identify whether the multicast packets were transmitted by the server and actually arrived at the client (receiver). This results in wasting valuable analyst time and/or additional expense when problems occur in the transmission and/or reception of these multicast packets.

BRIEF DESCRIPTION OF THE INVENTION

In one aspect, a computer-based method for detecting anomalies in the traffic passing through an internet protocol (IP) network is provided. The method includes extracting, from a database, a single instance of each unique packet header associated with a plurality of IP-to-IP packets, the IP-to-IP packets having been transmitted across the IP network over a predefined period of time, analyzing the packet headers to identify anomalous conversations based on at least one of a conversation uniqueness, a time of week uniqueness, and a data quantity uniqueness, and providing alerts corresponding to detected anomalous conversations.

In another aspect, a system is provided that includes a plurality of communicatively coupled computers configured to communicate via an internet protocol (IP) across a computer network, and a database containing a single instance of each unique packet header associated with a plurality of IP-to-IP packets, the IP-to-IP packets having been transmitted across the computer network over a predefined period of time. At least one of the computers of the network is programmed to analyze the packet headers in said database to identify anomalous conversations based on at least one of a conversation uniqueness, a time of week uniqueness, and a data quantity uniqueness, and provide at least one alert to a network user, the at least one alert corresponding to detected anomalous conversations.

In yet another aspect, a method for detecting anomalies in network traffic is provided. The method includes receiving a single instance of each unique packet header associated with a plurality of IP-to-IP packets, analyzing the packet headers to identify anomalous conversations, and providing alerts corresponding to detected anomalous conversations. Analyzing the packet headers is based on at least one of a determination, based on an IP-to-IP-on-Port conversation tuple, of whether a particular conversation has been conducted on the IP network over a historical and statistically relevant period, a determination whether a particular conversation has been conducted on the IP network in a specific hour of the week over a historical and statistically relevant period, and a determination whether a particular conversation conducted on the IP network has used a statistically different amount of bandwidth in a given hour of the week over a historical and statistically relevant period.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 7 is one embodiment of a screenshot that illustrates a "Search Conversations" tool.

FIG. 8 is a screenshot that shows multiple, independent summarizations of the network conversations observed over a defined time interval.

FIG. 13 illustrates an example user interface for displaying the information contained in a tracking database.

FIG. 15 is a sample web based display showing a list of observed multicast streams captured within a time period.

DETAILED DESCRIPTION OF THE INVENTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

The described embodiments are a core component of a security monitoring infrastructure system (SMIS). The SMIS makes use of certain core concepts to provide a fully integrated and full incident life cycle cyber situational awareness tool to the end user. It provides a process that a security analyst can use to efficiently and accurately determine and document information, including the potential and real threats on a network. The analyst can quickly track down the cause of an escalated alert and document findings in a straight forward point and click environment without the need to type anything but comments into a log.

Figure 1:
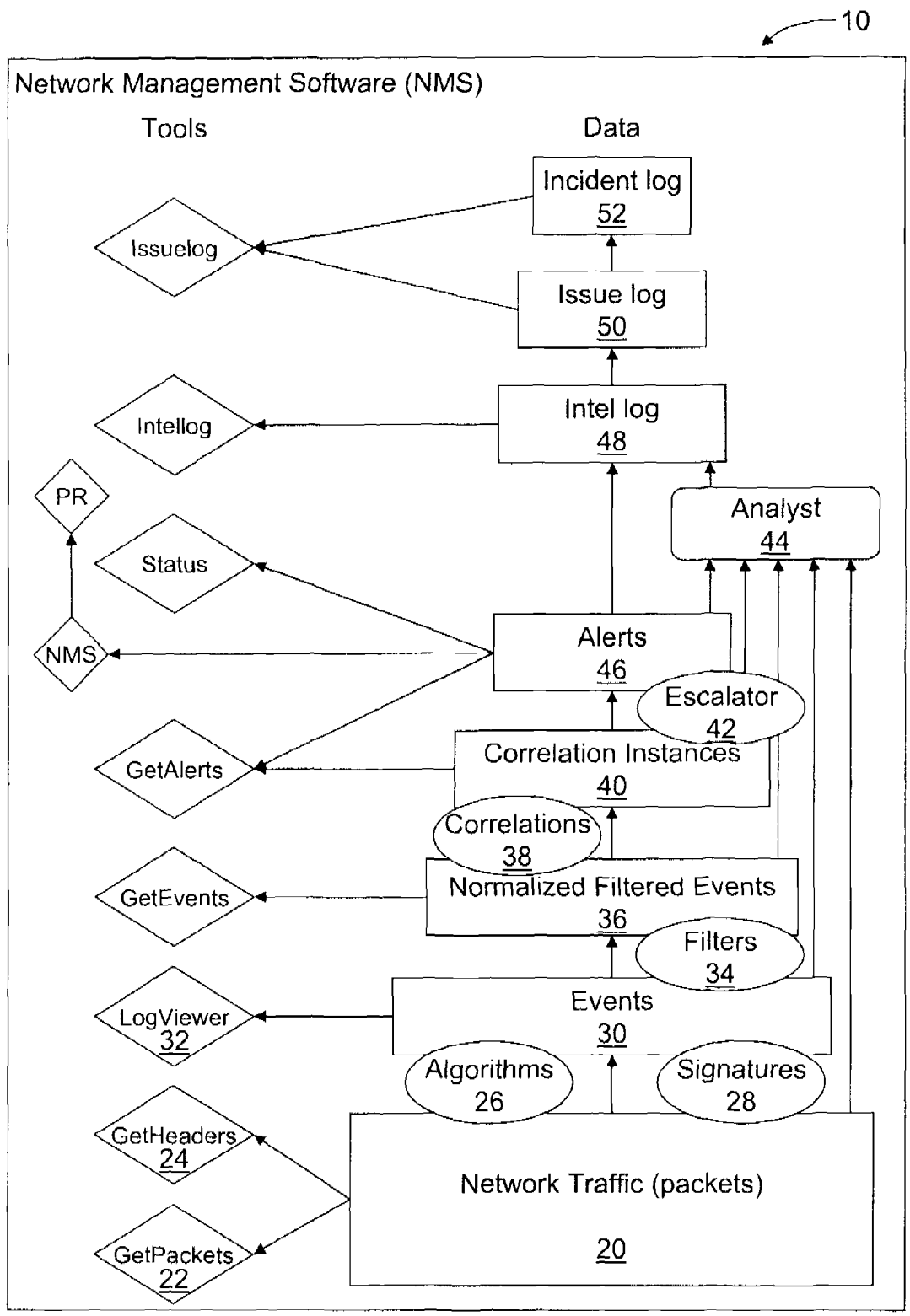
FIG. 1 is a diagram of a data security information environment.

FIG. 1 is a diagram 10 of a data security environment the SMIS is built around. As is known in the art, network security monitoring is based on the actual packets passing through a network (e.g. Network Traffic/Packets) 20. The SMIS provides two means to view this level of data, the first of which is the GetPackets tool 22 which allows raw access to a First-In-First-Out queue of all data packets observed by a sensor. The second tool at the Network Traffic layer 20 is GetHeaders 24, which is described in detail below and forms the basis for other system components throughout the SMIS system.

In the SMIS, the Network Traffic goes through both "Algorithms" 26 and "Signatures" 28 to create "Events" 30, which are the raw building blocks of the security analysis. These events may be created in the sensors based on sequential signature rule matches, e.g. traditional Intrusion Detection Systems (IDS) are based on this technology and it is quite mature, but events may also be created and placed into the event stream based on algorithms that process the packet data in non-sequential methods.

Security "Events" 30 can be viewed in the SMIS through the "LogViewer" tool 32. Security Events 30 are then passed through "Filters" 34 which are used to remove the events that are based on well known underlying conditions in the network, or which are deemed as normal activity and therefore should not be used as part of the correlation or escalation of security alerts.

After events have been filtered and normalized they are forwarded to a central repository, escalating them to "Normalized Filtered Events" 36 which can then be used to feed a correlation engine. "Correlations" 38 are general rules or algorithms used to automatically group and score "Normalized Filtered Events" 36 into "Correlation Instances" 40. These "Correlation Instances" 40 can then be scored and tracked over time via the "Escalator" 42, which is used to determine whether a given Correlation Instance 40 should be escalated to the attention of the security "Analyst" 44.

At the point of the "Alerts" 46, the human becomes part of the handling process, through, for example, one or more of status messages, indications from the network management software, and a get alerts process. A problem report (PR) indicator is utilized in FIG. 1 to indicate how an external problem report system might be connected into the SMIS system. Up to this point the entire system is built to automate the processing of the huge volume of network and security data so that only the most important data is presented to the analyst for human investigation. At this point the human analyst can gain access to every single level of the security data environment to make the necessary evaluations and analysis to determine whether a single or group of security alerts need some form of response.

The SMIS provides a complete drill down from the Alerts 46 down to the Correlation Instances 40, Normalized Filtered Events 36, Events 30, and the packet headers and raw packet data itself, all from within a simple point and click environment. The SMIS also provides additional higher levels of security data processing. Once an Analyst 44 has reviewed the Alerts 46 and all the data that fed into that escalation, he/she can insert the human intelligence into the process by putting a comment into the "Intel Log" 48 which is automatically associated with the "Alert" 46 (as appropriate). If there are a number of "Alerts" 46 that are all related to the same underlying issue, the SMIS provides a means to associate multiple Intel Log entries (and by reference the underlying Alerts 46, Correlations 38, Normalized Filtered Events 36, etc.) into a single "Issue Log" 50 entry which can then be tracked and reported on. Finally if necessary, the SMIS provides the concept and tools of an "Incident Log" 52 based on the "Issue Log" 50 entries to escalate the issue to a formal security incident response.

The SMIS provides full access to the entire environment of security data pyramid integrated within the same environment, providing simple point-and-click access to all of the data from every other level.

Figure 2:
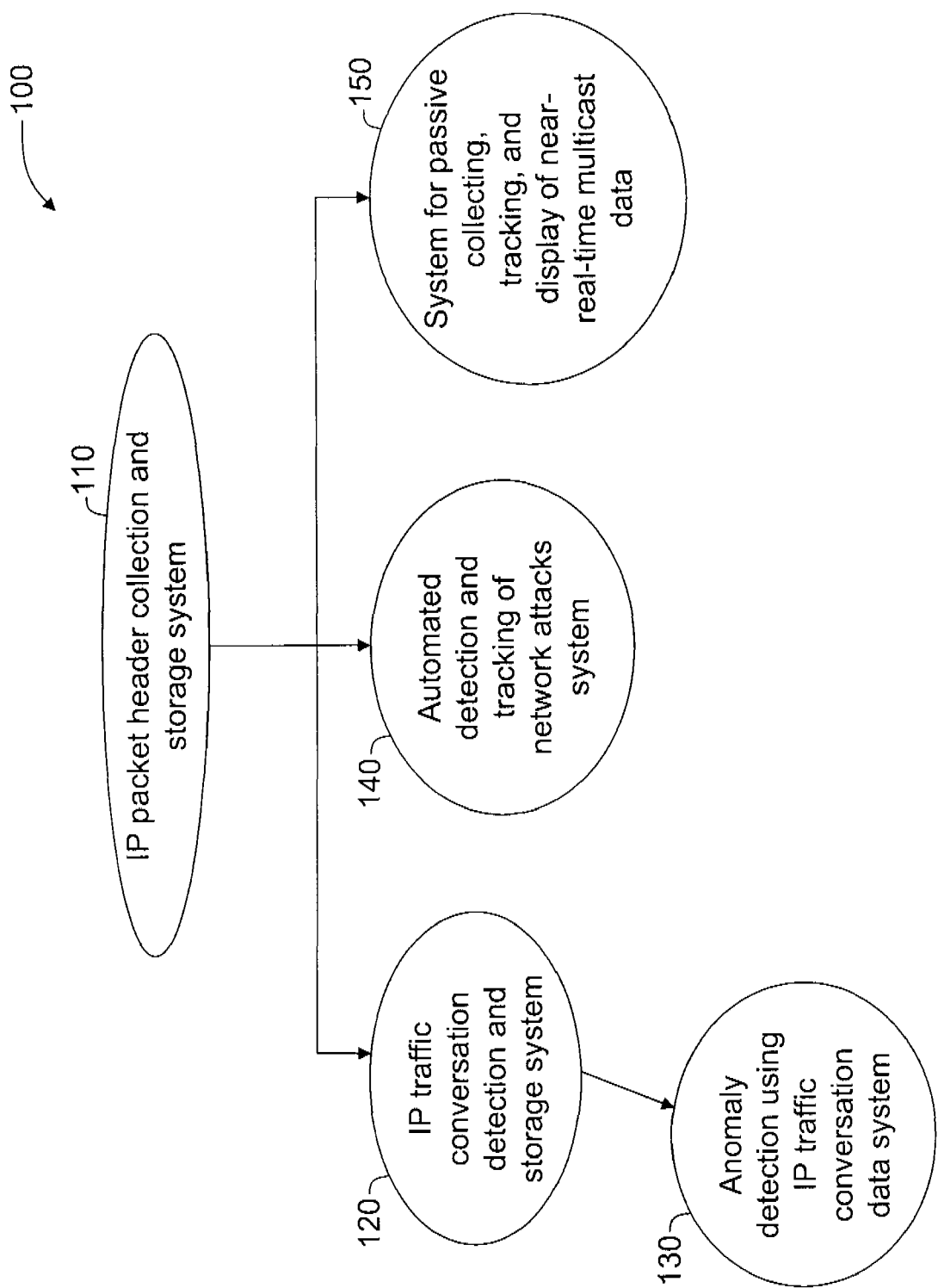
FIG. 2 is a diagram illustrating relationships within a security monitoring infrastructure system (SMIS).

In order to appreciate the invention to its fullest extent, the following disclosure will be segmented into five parts. FIG. 2 is an exemplary embodiment showing the relationship of the SMIS component systems 100. As used herein, the term exemplary indicates an example and not necessarily an ideal. Each component system is discussed in detail below. Part I discusses an IP packet header collection and storage system 110, Part II discusses an IP traffic conversation detection and storage system 120, Part III discusses an anomaly detection using IP traffic conversation data system 130, Part IV discusses an automated detection and tracking of network attacks system 140, and Part V discusses a system for passive collecting, tracking, and display of near-real-time multicast data 150.

I. IP Packet Header Collection and Storage

The SMIS component system 110 for IP packet header collection and storage collects, or captures, IP packets from a computer network, strips the packet header data from the captured IP packets, reviews the stripped packet header data for multiple occurrences of like-kind packet header data, and stores, for example in a database, a single instance of each unique packet header, for any reviewed packet headers that have been determined to have occurred multiple times.

More specifically, the SMIS component system 110 captures complete header information from each packet, uses counters to represent the number of occurrences of multiple like-kind packets, and inserts specific header information into a database for display, further processing, and analysis. System 110 allows only the complete header to be captured and stored, thereby reducing disk space requirements and eliminating the risk of packet header truncation. Also, system 110 only stores a single copy of like-kind packets plus a counter, instead of storing every packet header separately.

In one embodiment, system 110 includes two programs. The first program, referred to herein as "headercap," performs the "header collection" element, and the second program, "db_process_packet," performs the "header parsing and storage" element.

Figure 3:
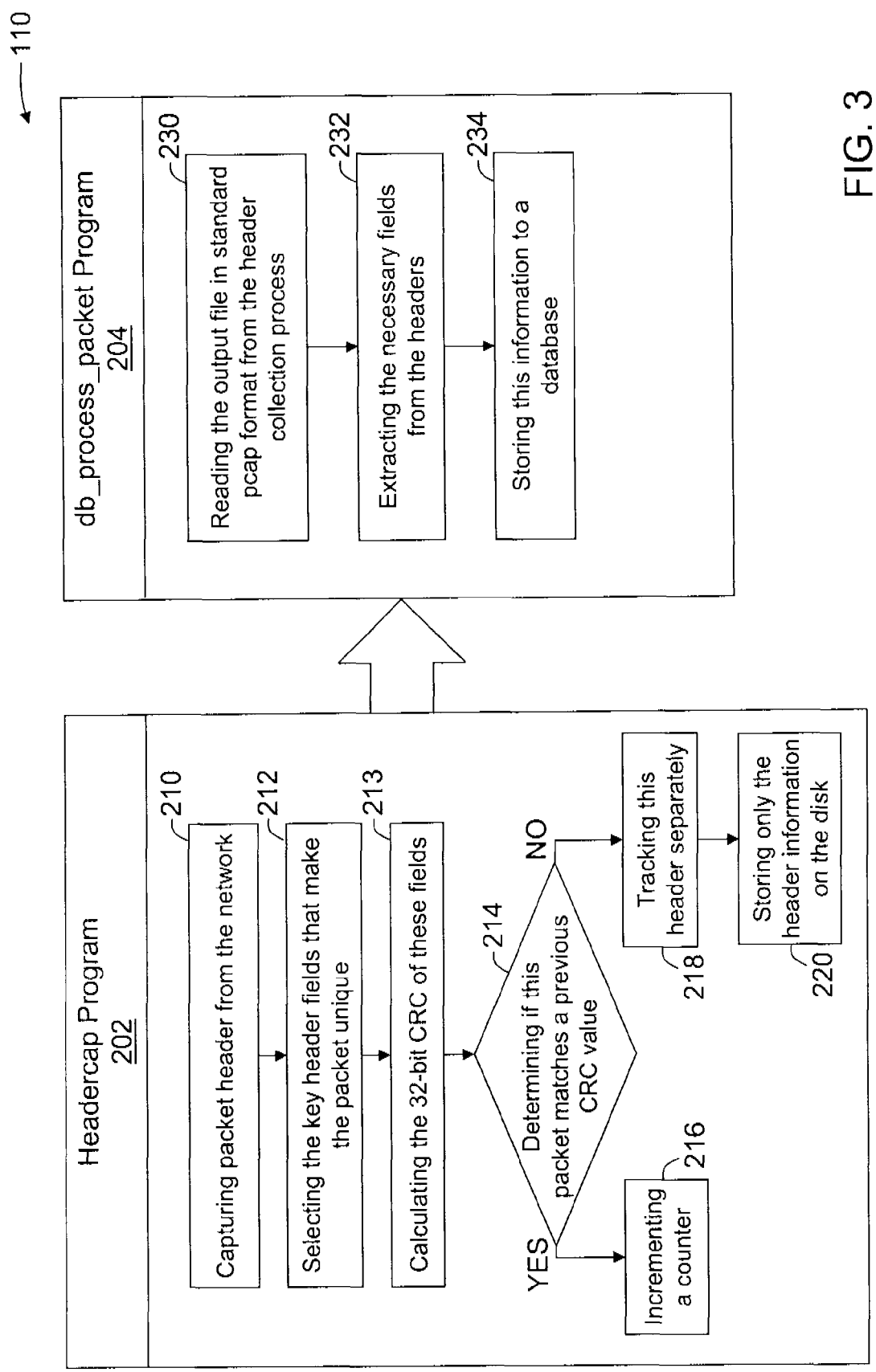
FIG. 3 is a process flowchart showing the various component programs associated with the header collection process of the SMIS.

FIG. 3 is a process flowchart showing the various component programs associated with a security monitoring infrastructure system (SMIS) 110. At least some of the elements of the headercap program 202 are to capture 210 packet headers of the IP packets from the network, select 212 the key header fields that make the packet header unique and calculate 213 the 32-bit cyclic redundancy check (CRC) of these fields. If it is determined 214 that the packet header matches a previous CRC value, a counter is incremented 216, otherwise the header is tracked 218 separately and stored 220. Such a storage scheme is operative to reduce the bandwidth required to transfer the packet headers to the database, and reduce the storage requirements of the database. At least some of the elements of the db_process_packet program 204 are to read 230 the output file in standard pcap format from the header collection process, extract 232 the necessary fields from the headers, and store 234 this information to a database. Pcap refers to a standard file format for recording network traffic.

The headercap program monitors the network for new packets to arrive. When headercap receives a packet header, it processes the packet and waits for the next packet header. The time, in CPU cycles, required to process each packet header is decreased by limiting the packet header information to that of the selected header fields.

Headercap maintains a cache of packets it has received. Rather than maintaining multiple copies of like-kind packets and associated packet headers, counters are incremented for similar, or like-kind, packet headers, and old cache entries are written to disk when the cache fills up, to make room for new packet headers. The user can specify the size of the cache (to correspond with a number of packet headers represented) and the time interval over which to write the packet headers to disk. In one embodiment, the time interval is one minute. Headercap creates a new file for each interval, and packets are written to the respective file depending on the interval in which they were received. The output file is in standard pcap format, with additional information from the cache written to the data portion of each packet.

Figure 4:
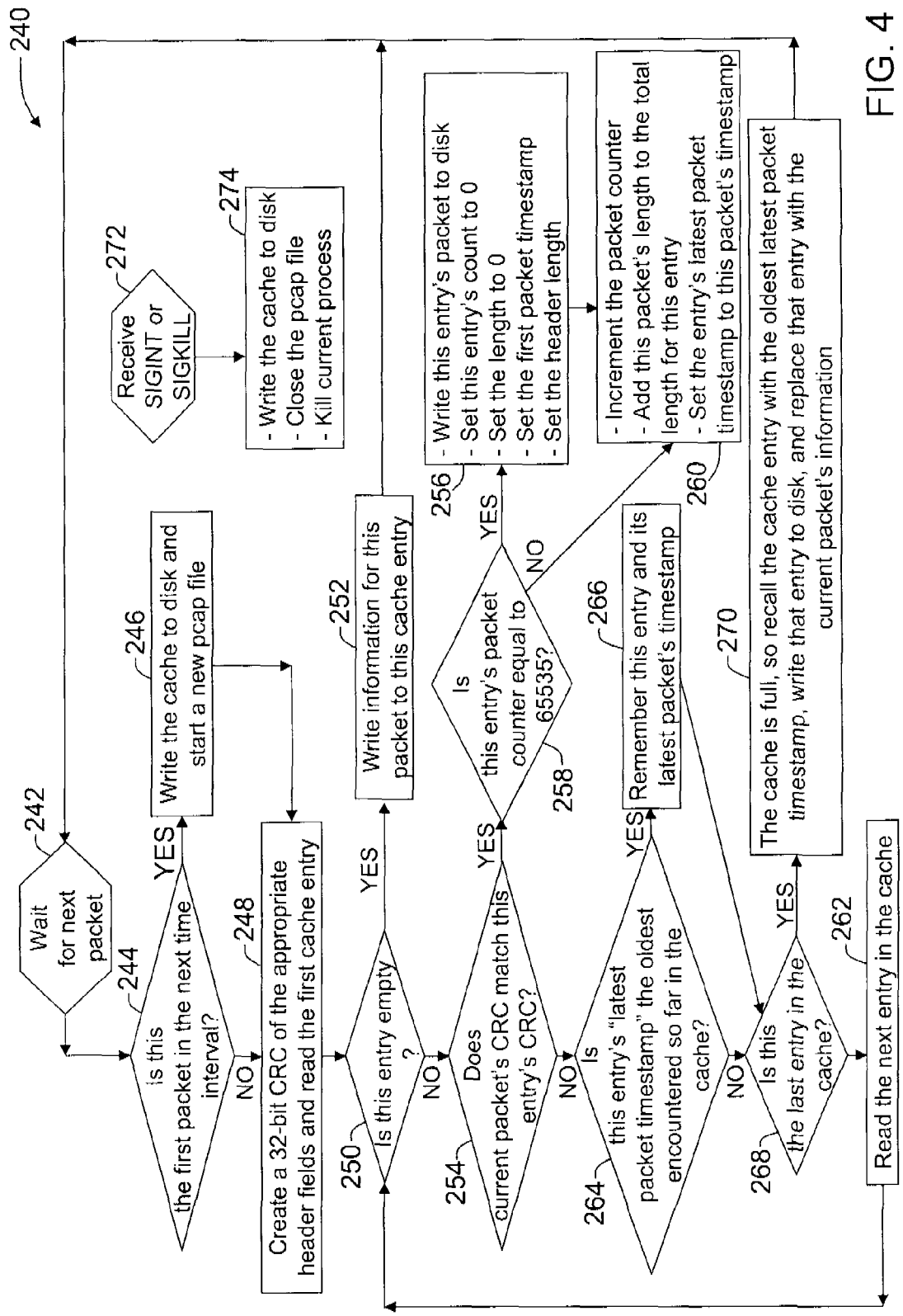
FIG. 4 is a flowchart illustrating a headercap process.

FIG. 4 is a headercap process flowchart. When headercap 202 is started, the cache is initialized, every cache entry is marked as being empty, and headercap 202 waits 242 for the next packet header to arrive. When a packet header arrives, the timestamp is checked to determine 244 whether the packet header arrived in the current time interval or the next time interval. If it is the first packet in the next interval, the current cache is written 246 to disk, cleared, and a new file, in standard pcap format, is initialized.

Then headercap 202 creates 248 a 32-bit CRC by calculating the 32-bit CRC across the selected header fields that make the packet header unique. In the exemplary embodiment, the selected fields used in the CRC calculation include at least one of the following:

All fields from the Ethernet header and virtual local area network (VLAN) tag,

IPv4 header: Time-To-Live (TTL), Protocol, Source IP address, Destination IP address, IPv6 header: Next Header, Hop Limit, Source IP, Destination IP, Internet Control Message Protocol (ICMP) header: Type, Code, Transmission Control Protocol (TCP) header: Source Port, Destination Port, Flags, and User Datagram Protocol (UDP) header: Source Port, Destination Port.

In the exemplary embodiment, each cache entry is a data structure, itself containing additional information for each packet header as follows:

Number of packet headers like the one in the cache entry,

Sum of all the lengths of all the packet headers like the one in the cache entry, Timestamp of the first packet headers like the one in the cache entry, Timestamp of the last (latest) packet headers like the one in the cache entry, CRC32 of the pertinent bits of packet header information, Pointer to the header data from the packet header, and Length of the header data from the packet header.

Once the CRC has been calculated, headercap 202 determines 250 if the first entry is empty. If it is empty, the packet header data is written 252 to this entry in the cache. Cache entries are populated in order, so the first empty entry is always the last entry in the cache. This design maximizes performance because no entry checks are necessary beyond the first empty entry.

If the first cache entry is not empty, headercap 202 determines 254 if the current packet's CRC matches the first cache entry's CRC. If it matches, then the current packet header is considered to be of like-kind to the packet header(s) represented by this cache entry, so the counter is incremented 256, the length is increased by the size of the packet header, and the latest packet header timestamp is updated with the timestamp of the current packet header. Before this happens, the packet counter is checked 258 for an overflow condition. If incrementing the counter would cause an overflow, the cache entry is written 260 to disk, the count and length are set to 0, the first packet header timestamp is set, and the IP packet length is set. Average packet lengths of up to 65537 are supported in this implementation, so no check is required for packet length overflows, thereby saving approximately one CPU cycle per packet. In one embodiment, the data type used to represent packet length is a 32-bit unsigned integer, so the sum total of all packet lengths in a cache entry can be up to a maximum of 4,294,967,295 bytes (2^32−1). Since the embodiment allows only 65,535 packets to be represented in each cache entry (0 is reserved to represent an empty cache entry), the average packet length of all the packets that could be stored is 4,294,967,295/65535=65537. Since the maximum packet size of an IP packet is 65535 bytes, an overflow is not possible.

If the first cache entry is not empty and the CRC does not match, each successive cache entry is read 262 until an empty entry is found, the CRCs match, or the cache is full. As each entry is checked, headercap 202 determines 264 if this entry's "latest packet timestamp" is the oldest encountered so far in the cache, and if so, headercap remembers 266 this entry and its "latest packet's timestamp". Also, as each entry is checked, headercap 202 determines 268 if this entry is the last entry in the cache. If all the cache entries are full and there is no CRC match, the entry with the oldest 'latest packet timestamp' is recalled 270 and written to disk and the cache entry position is free to be replaced by the current packet header. Since the released entry is the oldest in the cache, further packet headers like this are generally the least likely to be seen again during the remainder of the specified time interval, so cache entry replacement is minimized. Headercap 202 having completed the process for this packet again waits 242 for the next packet to arrive. At any time, if a SIGINT, SIGTERM or SIGKILL signal is received 272, the cache is written 274 to disk and the process is terminated.

The structure of the cache was specifically designed for efficiency. It is an in-memory cache, allowing for rapid processing of packets as they are captured. Since the cache is flushed to disk after each time interval, sessions with high volumes of IP packets tend to occupy the first cache entries. This remains true even as traffic patterns change over time because the cache is cleared after every interval. This high-volume-first approach allows for the first few cache entries to be checked to be the most frequently recurring like-kind packets, thereby substantially increasing performance. Sessions that are most likely to contain high quantities of like-kind packets include large file transfers, streaming audio and video, and tunneling protocols such as IPsec and GRE.

As mentioned above, when packets are written to disk, they are written in standard pcap format. This makes decoding easy, since the pcap library is commonly used and is available in many common programming languages. It also requires less development time than creating a new storage format, and makes troubleshooting easier since the output files of headercap can be read directly by any packet decoder that supports the pcap format.

The cache is used to count like-kind packets. Since each packet is associated with a count, total length, and multiple timestamps, a side channel was required to convey this information for each packet header in the pcap file. Headercap stores these values in the data portion of the packet. Specifically, the count, length, and first packet timestamp are stored in the data portion. The latest IP packet timestamp is stored in the field of the pcap data structure that records the time the IP packet was seen on the wire.

When headercap writes the header information to disk, it writes only the packet header portion of the IP packet. This minimizes the number of bytes that will be required to be transferred back over the network to, for example, a database server. Once the pcap file has been written to disk and headercap is writing packet headers in the next interval pcap file, db_process_packet 204 can read 230 the packets from the finished file, extract 232 and decode the necessary fields, and store 234 the information in a database. The database should have native support for IP address data types used for both IPv4 and IPv6 network versions.

When db_process_packet 204 reads 230 a packet header from the pcap file, it extracts 232 the pertinent fields for processing. For example, db_process_packet 204 extracts the latest packet timestamp and source/destination MAC addresses from the Ethernet header. If there is a VLAN tag, db_process_packet 204 extracts the VLAN ID. db_process_packet 204 then extracts the source and destination IP addresses from the IP header, and the protocol/Next Header and TTL/Hop count, depending on the IP version (4 vs 6). For TCP and UDP, db_process_packet 204 extracts the source/destination port numbers. For TCP, db_process_packet 204 also extracts the flags. For ICMP, db_process_packet 204 extracts the Type and Code fields. Once the packet header has been processed, the count, length, and first-packet timestamp are extracted from the data portion of the packet header.

As each packet header is processed, the SQL to insert the data from each packet header is generated. This SQL is stored in an in-memory buffer. When the buffer is full, the SQL is transmitted to the database via a direct API call. This allows thousands of packet headers to be inserted simultaneously into the database, eliminating thousands of function calls to the database API each time, and substantially increasing performance. This packet header data is now available to the security analyst or automated tools for security analysis, such as IP traffic conversation detection and storage that is discussed below.

II. IP Traffic Conversation Detection and Storage

The SMIS component system for IP traffic conversation detection and storage 120 allows an analyst to track and record conversations through processing packets obtained in the IP packet header collection and storage system 110 discussed previously. System 120 relies on the header capture and storage capability found in the IP packet header collection and storage system 110 discussed above.

As described further herein, system 120 provides a user with a computer-based method for collecting and storing types and quantities of traffic passing through an IP network. As further described herein, in accordance with the accompanying figures, the method includes extracting, from IP packet header collection and storage system 110 a single instance of each unique packet header associated with a plurality of IP-to-IP packets, the IP-to-IP packets having been transmitted across the computer network over a predefined period of time. A highest probability service port for each IP-to-IP packet combination is determined using the extracted packet headers, and all the IP-to-IP-on-Port packet combinations are accumulated into a single record that includes a first packet time, a last packet time, and a total number of bytes transferred. The records for all IP-to-IP-on-Port conversations in the database are stored. Then the packets based on IP-to-IP-on-protocol if the packets were part of a protocol where port numbers do not exist are accumulated, and the accumulated packets where port numbers do not exist in the database are stored.

More specifically, system 120 tracks the conversations during a given time interval, not just selected traffic. System 120 tracks both bandwidth usage as well as total amount of data transferred. System 120 determines the true service port associated with a conversation, passively, requiring no load to be added to the network, and determines what services a given device is offering to the network.

In addition, system 120 records continuously, instead of over user specified periods or user specified IP addresses. System 120 selects the actual service port leading to more accurate data analysis and also records the resulting data into a user searchable database providing opportunities for analysis and data mining not present in other solutions.

Figure 5:
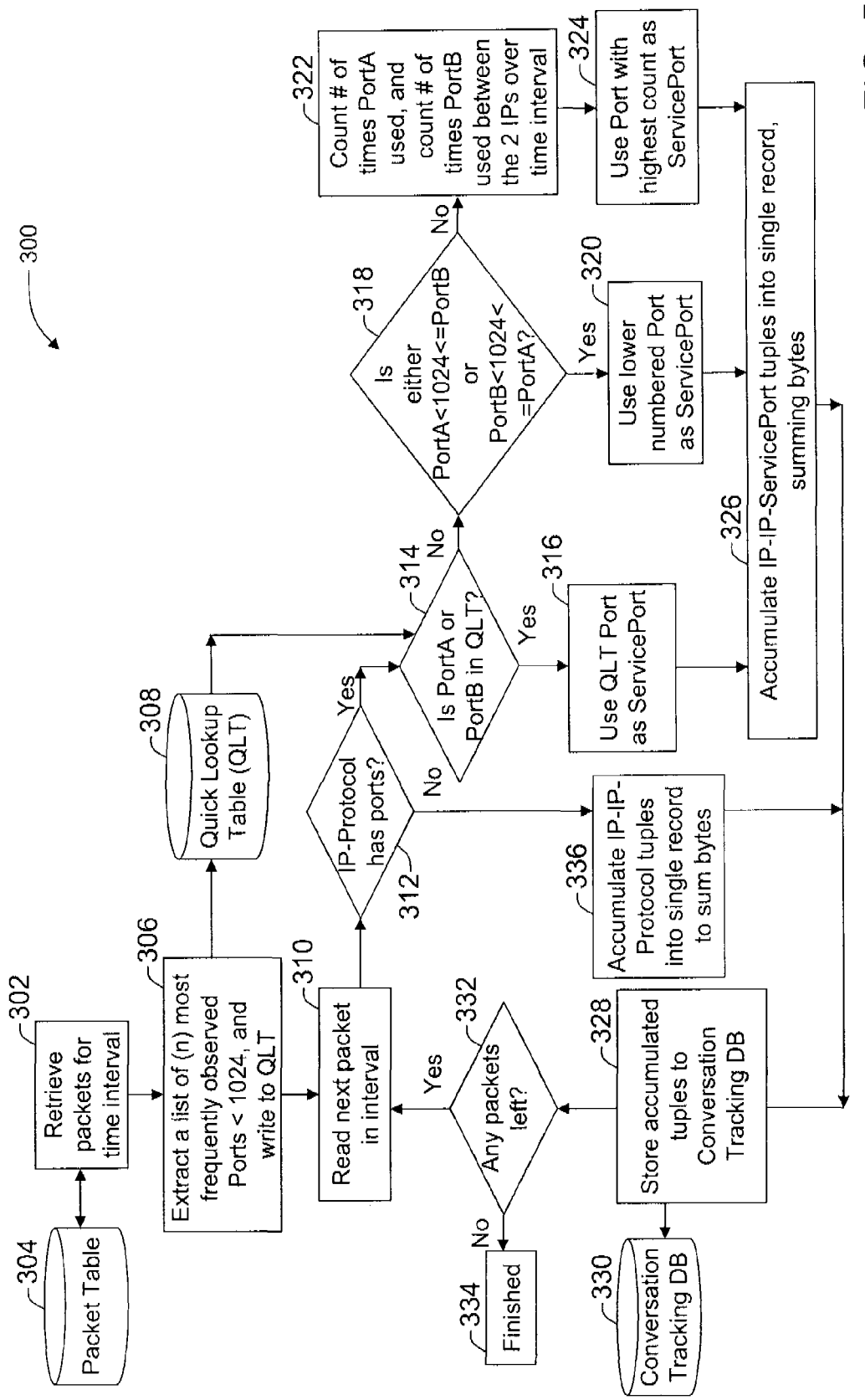
FIG. 5 is a flowchart that shows the conversation tracking functions performed in the SMIS.

FIG. 5 is a flowchart 300 showing the functions performed by system 120 in conversation tracking. In step 1, retrieve 302 the packets data from a packet table 304 for the predetermined time interval. In one embodiment, the predetermined time interval is five minutes. The packet header selected data includes source and destination IP addresses, source and destination port numbers, a first time seen in the time interval, a last time seen in the time interval, and a total number of bytes represented by this header set. Also, a list of the most frequently observed port numbers less than 1024 is extracted 306, and written to a Quick Lookup Table (QLT) 308. It is commonly known in the art that operating systems do not typically assign a value less than 1024 as the source port of a TCP or UDP conversation, unless the source and destination ports are the same. And therefore, ports with numbers less than 1024 are typically service ports.

Continuing, the next packet headers in the time interval are read 310 to begin determining which of the ports between the pair of IP addresses (e.g. the source and destination IP addresses) has the highest probability of being the service port of the IP-to-IP packet combination associated with the packet header. Source and destination distinctions must be ignored since the time interval in question could have started or ended at any point in the IP-to-IP conversation. The IP addresses and the associated port numbers are the main necessary elements in the analysis. It is also determined 312 if the packet's IP-protocol has ports. Some IP based protocols do not have port numbers as with TCP or UDP, and will be discussed later.

If the IP-protocol has ports, then each IP-to-IP packet set is examined to determine the relationship between the two port numbers, e.g. Port A and Port B, of the packet. The first check 314 is whether either of the port numbers are in the Quick Lookup Table. If so, then that QTL port number is selected 316 as the actual service port of the IP-to-IP packet combination.

The second check 318 is shown in the two following equations: Port A<1024<=Port B and Port B<1024<=Port A. If either of these equations are true, then automatically the port with the lowest number is selected 320 as the actual service port and the other port number is ignored for this conversation. As previously mentioned, operating systems do not typically assign a value less than 1024 as the client/source port of a TCP or UDP conversation, unless the source and destination ports are the same.

The third check 322 is whether both port numbers are below, equal to or above 1024. If both port numbers fall within one of these three areas, then a count is made, over the entire time interval, of the number of times each port number, e.g. of Port A and Port B, is in any of the IP-to-IPs conversations. It is common in IP protocols that throughout the IP-to-IP conversations between the client and the server, the client chooses a random port, while the connection to the server is on a particular service port. Therefore, by counting the number of times the individual ports are used between the two IP addresses, over the entire time interval, the port number with the highest count is selected 324 as the actual service port.

Whether from the first, second or third check, upon selecting the actual service port, all IP-to-IP-ServicePort tuples are accumulated 326 into a single record, including first packet time, last packet time, and total number of bytes transferred.

System 120 forms a 3-part unique tuple by placing the two IP addresses in a fixed order (i.e. commonly lowest value first, then highest value) then tacking on the port number. All packet streams that match this tuple, for example, having the same pair of IP address regardless of source and destination indications, and having this port as either the source OR destination port, are then accumulated by summing up the number of bytes in each packet and recording the earliest start time and latest end time for the packets observed in this time interval.

Once the tuples data has been accumulated, the tuples are stored 328 in a conversation tracking database 330 to track the two IP addresses (in some fixed order), the service port number, the total bytes transferred, and the earliest and latest packet times. Appropriate indexes are created in the database to allow for efficient access and retrieval during later use of this data. On completion of the above process for the current packet, it is determined 332 if any packets remain to be processed. If so, then the next packet is retrieved 302. If not, then the analysis of this time interval is finished 334 and system 120 awaits the next time interval of packet data.

As previously mentioned, there are some occurrences of packets of an IP based protocol that does not have port numbers. Upon such occurrences, determination of a service port is not required. In this case, the 3-part unique tuple, as described above, is formed by using the IP addresses in fixed order, but system 120 instead selects the IP Protocol number as the service port number. An IP-to-IP-Protocol tuple is accumulated 336 into a single record. The protocol number is stored as a negative number (i.e. it is multiplied by −1) to indicate that it represents an IP protocol and not a TCP or UDP port number. The accumulation 336 is otherwise carried out as outlined above. The IP-to-IP-Protocol tuples are then stored to the conversation tracking database.

Figure 6:
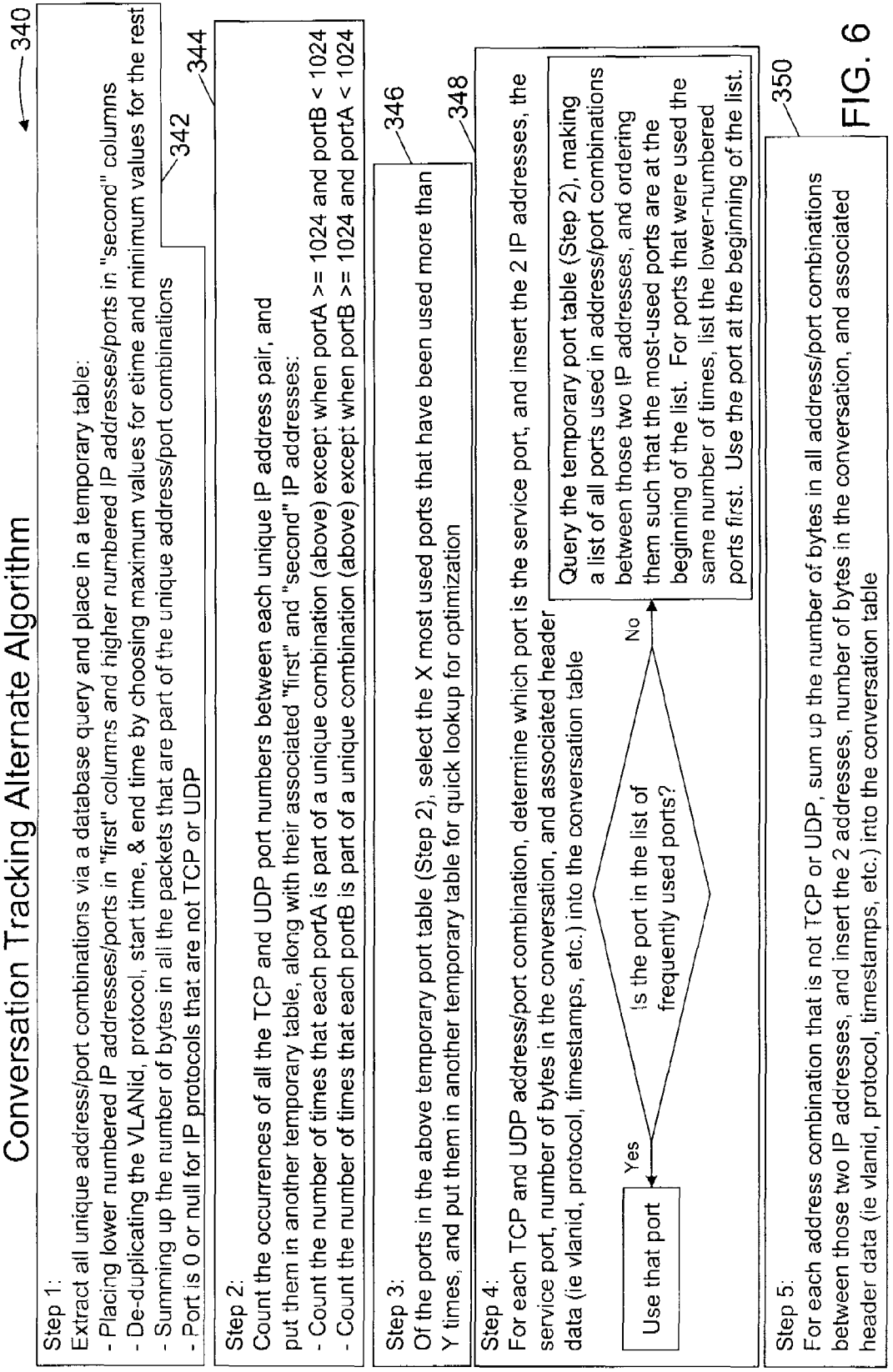
FIG. 6 is a flowchart that illustrates an alternative algorithm for conversation tracking that can be performed in the SMIS.

FIG. 6 is a flowchart 340 illustrating an alternative algorithm for conversation tracking. In the illustrated algorithm, all of the unique IP address/port combinations are extracted 342 via a database query and those unique combinations are placed in a temporary table. In the table, the lower numbered IP addresses/ports are placed in "first" columns and the higher numbered IP addresses/ports are placed in the "second" columns. The VLANID (virtual local area network identifier), protocol, start time, and end time are "de-duplicated" by choosing the maximum values for end time and minimum values for the rest. This is necessary because the packets in the conversation may have traversed multiple VLANs, and because the conversation start and end times should represent the timestamps of the first and last packets received during the specified time interval. The number of bytes in all the packets that are part of the unique address/port combinations is summed. For IP protocols that are not TCP or UDP the Port value is 0 or null.

The occurrences of all the TCP and UDP port numbers between each unique IP address pair are counted 344, and placed in another temporary table, referred to herein as a temporary port table, along with their associated "first" and "second" IP addresses. Specifically, the number of times that each port A is part of a unique combination is counted 344 except when port A>=1024 and port B<1024, and the number of times that each port B is part of a unique combination is counted 344 except when port B>=1024 and port A<1024. For the ports in the temporary port table, the X most used ports that have been used more than Y times are selected 346, and put into a third temporary table for quick lookup for optimization.

For each TCP and UDP address/port combination, the service port is determined 348, and the two IP addresses are inserted into the conversation table, as well as, the service port, number of bytes in the conversation, and associated header data (i.e., VLANID, protocol, timestamps, etc.). If the service port is in the list of frequently used ports, then the determined 348 port is used, otherwise, the temporary port table is queried. A list of all ports used in address/port combinations between those two IP addresses is made and ordered such that the most-used ports are at the beginning of the list. For ports that were used the same number of times, the lower-numbered ports are listed first, and the port at the beginning of the list is used.

For each address combination that is not TCP or UDP, the number of bytes in all address/port combinations between those two IP addresses is summed 350, and the two addresses are inserted into the conversation table, as well as a number of bytes in the conversation, and associated header data (i.e., VLANID, protocol, timestamps, etc.).

FIG. 7 is one embodiment of a screenshot 360 that illustrates a "Search Conversations" tool. The tool provides a summary of all conversations associated with any IP address in the 192.48.0.0/24 subnet that happened in the last four days.

Figure 8:
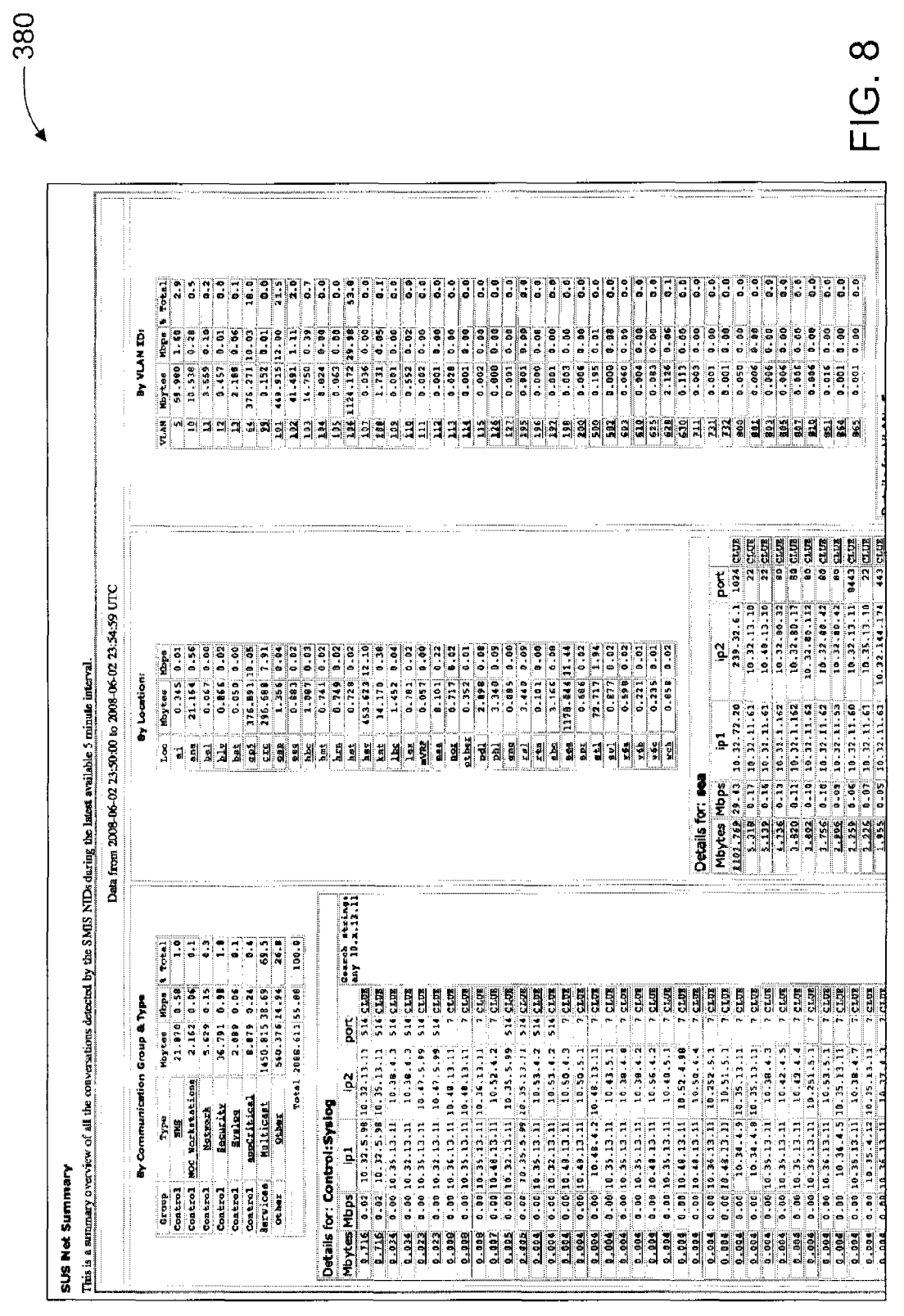

FIG. 8 is one embodiment of a screenshot 380 that shows a "current status" showing three columns, each of which is an independent summarization of the conversations seen in the last five-minute interval. In the illustrated embodiment, the columns are sorted by communication group and type, by location, and by VLAN ID. In each column, one of the rows can be selected to view the top 50 conversations that make up that summarization line.

System 120 collects and stores information the types and quantities of traffic passing through an IP network. The information is then recorded for later use and analysis. This type of data provides the building blocks to perform more advanced analysis, such as anomaly detection that is discussed below.

III. Anomaly Detection Using IP Traffic Conversation Data

The SMIS component system for anomaly detection using IP traffic conversation data 130 locates anomalous network activity and generates an alert based on that detection. Identifying network anomalies involves understanding user behavior.

System 130 performs anomaly detection by analyzing recurring network traffic patterns and conversation correlation. Network traffic patterns involve the fact that almost all network traffic is repetitive. Backups happen at the same time every week. Users arrive at work at the same time each day/week and perform similar activities every day/week. Conversation correlation involves using the data collected and grouped in the IP traffic conversation detection and storage system 120 previously discussed. The conversation tracking database provides the conversation participants along with the connection used by them to communicate.

As further described herein, system 130 provides a computer-based method for detecting anomalies in the traffic passing through an IP network. As further explained herein, said method includes extracting a single instance of each unique packet header associated with a plurality of IP-to-IP packets, as described above with respect to system 110, where the IP-to-IP packets have been transmitted across the IP network over a predefined period of time. The method further includes analyzing the packet headers to identify anomalous conversations based on at least one of a conversation uniqueness, a time of week uniqueness, and a data quantity uniqueness and providing alerts corresponding to detected anomalous conversations.

More specifically, system 130 contains a detection algorithm that performs anomaly detection at regular time intervals against all conversations tracked during that interval and outputs relevant security events to a Security Event Management (SEM) system. At least one of three types of anomalies are used to categorize identified anomalous network activity.

The first type of anomaly is a "Conversation Uniqueness" anomaly which is a test for whether a particular conversation (i.e. IP-to-IP-on-Port tuple) had been previously identified in a predetermined historical and statistically relevant period. In one embodiment, the predetermined relevant period is six weeks.

The second type of anomaly is a "Time of Week Uniqueness" anomaly which is a test for whether a particular conversation had previously occurred in the same hour of the week within a predetermined historical and statistically relevant period. In one embodiment, the predetermined relevant period is six weeks.

The third type of anomaly is a "Data Quantity Uniqueness" anomaly which is a test for whether a particular conversation had previously used a statistically different amount of bandwidth in a given hour of the week within a predetermined historical and statistically relevant period. In one embodiment, the predetermined relevant period is six weeks.

Figure 9:
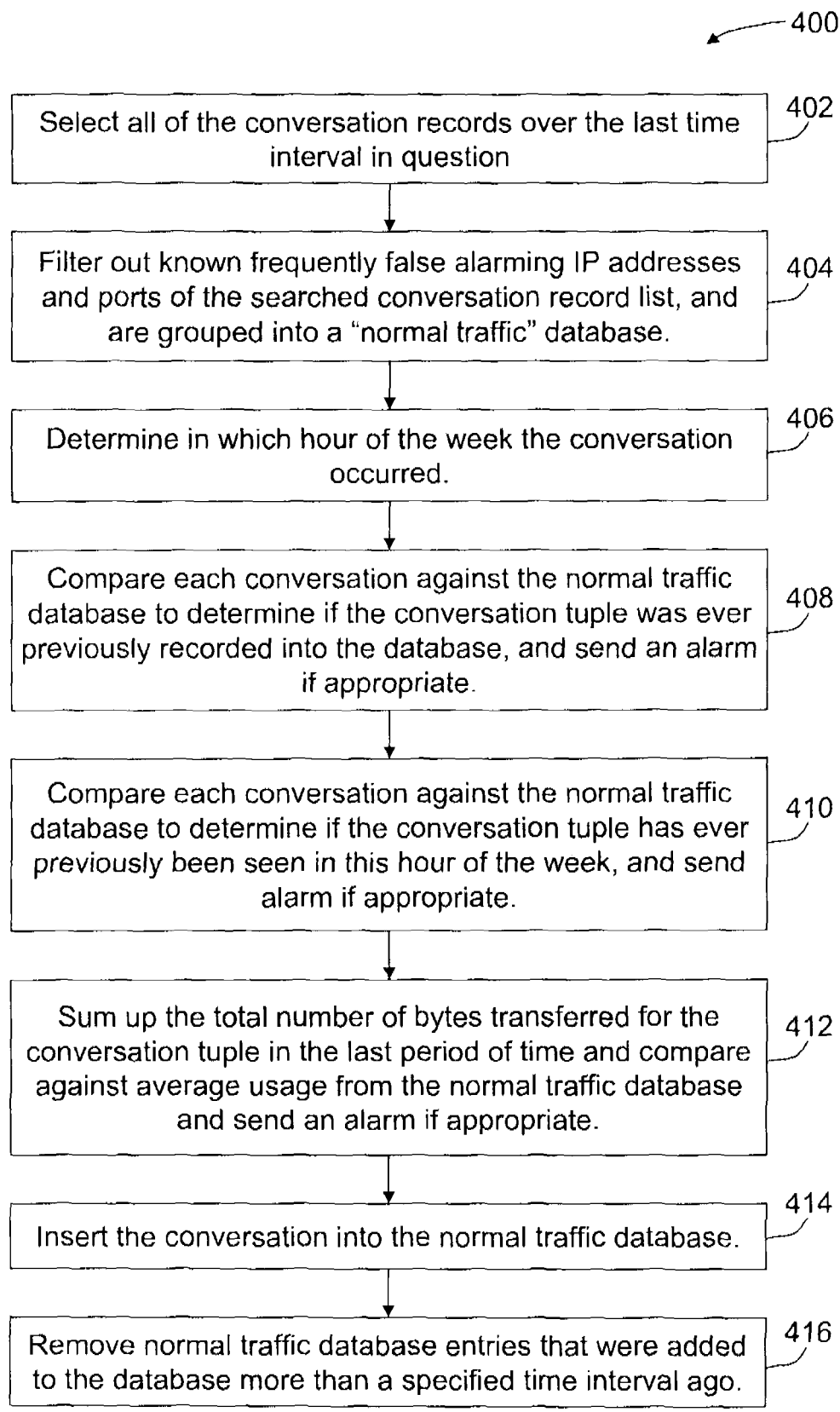
FIG. 9 is a flowchart showing the functions performed by a system in detecting anomalous network activity.

FIG. 9 is a flowchart 400 showing the functions performed by system 130 in detecting anomalous network activity. All of the conversation records over the last time interval in question are selected 402. In one embodiment, the length of the last time interval in question is one hour. The conversation record selection data includes at least one of both IP addresses (i.e. source and destination), the protocol, the port, and the number of bytes recorded. Collectively this data is the conversation tuple IP-to-IP-on-Port. The conversation records are obtained through the IP traffic conversation detection and storage system 120, previously discussed.

Known frequently false alarming IP addresses and ports of the searched conversation record list are filtered 404 out, and are grouped into a "normal traffic" database. At least a portion of the IP network traffic is well known and documented, and is considered safe or highly improbable of causing danger. In spite of the relative safety, this type of traffic can still cause security false alarms to be generated and unnecessary analysis time to be expended. At least one of the following types of filtering can be used to identify frequently false alarming network traffic: filtering out all conversations between a pair of IP address, filtering out all conversations where a specific IP and port are found, filtering out all conversations where a single IP address is involved, and filtering out all conversations that occur on a specific port.

Next, a determination 406 in which hour of the week the conversation occurred is made. Network traffic is frequently cyclical in nature, for example, backups generally happen every week at the same time, users generally arrive to work at the same time each day and perform common tasks, automated processes kick off at the same time every day or week, etc. Based on this repetition information, system 130 organizes network traffic into groups based on the hour of the week in which the conversations occurred. The hours of the week are numbered from 0 to 167 in one embodiment. Exactly which hour of the week is the "0" hour is not important so long as all bucket calculations return the same value for a given hour of the week. In the exemplary embodiment, the hours are numbered sequentially to simplify calculation of "immediately previous" and "immediately following" hours. In one embodiment, the time interval is one hour. In an alternative embodiment, the time interval is one of 30 minutes and 90 minutes.

Each conversation is compared 408 against the normal traffic database to determine if the conversation tuple was ever previously recorded into the database, and if appropriate, an alarm is sent. This is the first of the anomaly tests, the "Conversation Uniqueness" test discussed above. The normal traffic database holds all previously accumulated and checked conversation data. The normal traffic database holds data for a predetermined period of time. In one embodiment, the predetermined period of time is at least six weeks.

Each conversation is compared 410 against the normal traffic database to determine if the conversation tuple has ever previously been seen in this hour of the week, and send alarm if appropriate. This is the second anomaly test, the "Time of Week Uniqueness" test discussed above. The conversation tuple is compared to other conversations tracked in the normal traffic database that occurred in the same hour of the week. An additional test under the "Time of Week Uniqueness" test is to determine if the conversation occurred in at least one of the immediately previous or immediately following hour of the week. Therefore, an alarm is generated if the conversation in question was not identified in the immediately previous, current, or immediately following hour of the week. This procedure assists in accurately assessing the network traffic occurrence when a user does not perform the same tasks at the exact same time of the week.

The total number of bytes transferred for the conversation tuple in the last period of time is summed 412 and compare against average usage from the normal traffic database. An alarm is sent if appropriate. This is the third anomaly test, "Data Quantity Uniqueness" test discussed above. The summed value is compared to the average usage as mentioned, but is also compared to the recorded values in the normal traffic database to identify a conversation with a similar summed number of bytes for the same hour of the week. In one embodiment, the period of time is one hour. In one embodiment, determined test result values greater than two standard deviations above the recorded average generate an alarm. In an alternative embodiment, any predetermined amount of deviation above the normal traffic database average will generate an alarm.

The conversation is inserted 414 into the normal traffic database. The conversation tuple that does not generate an alarm throughout the testing is submitted to the dynamic re-baselining step of the process. The conversation tuple, along with the number of bytes accumulated and the hour of the week it was recorded are added to the database. This allows the algorithm to continually re-define normal traffic, and therefore allowing for automatically accommodating the changes in the normal traffic flow of the network.

Normal traffic database entries that were added to the database more than a specified time interval ago are removed 416. In one embodiment, the predetermined period of time is at least six weeks. The removing 416 step is also part of the dynamic re-baselining step of the process. Network behaviors change over time, therefore removing the data older than a predetermined time limit allows for new average values to be automatically formed.

Alarms can be sent in any of a number of methods, commonly by writing to a file or sending an SNMP (Simple Network Management Protocol) trap. In one embodiment, system 130 finds anomalous activity in any IPv4 or IPv6 network. System 130 is configured to dynamically re-baseline itself, therefore there is no need for user "training" or coding or configuration.

IV. Automated Detection and Tracking of Network Attacks

The SMIS component system for automated detection and tracking of network attacks 140 allows an analyst to track an attacker through a network by identifying scanning systems, displaying scan data from suspicious nodes and identifying possibly compromised nodes. System 140 utilizes the packet header data obtained by the IP Packet Header Collection and Storage system 110 previously discussed.

System 140 enables a method for tracking an attacker through a computer network. In one embodiment, the method includes extracting a single instance of each unique packet header associated with a plurality of IP-to-IP packets from a database, where the IP-to-IP packets have been transmitted across individual nodes of the computer network over a pre-defined period of time. The method also includes identifying potential attacking nodes based on which of the packet headers include a TCP SYN/ACK packet therein, because the presence of a TCP SYN/ACK packet indicates that a responding node is willing to establish a connection with a node that sent a TCP SYN packet.

The method continues by identifying potential attacking nodes, from the packet headers, based on which nodes were recently added to the network, attempting to clear a portion of the identified potential attacking nodes based on data in the packet headers relating to at least one of an amount of data transferred between the nodes of the network and the scanning activities of the nodes that responded with a TCP SYN/ACK packet, and presenting the remaining identified potential attacking nodes to a user.

Figure 10:
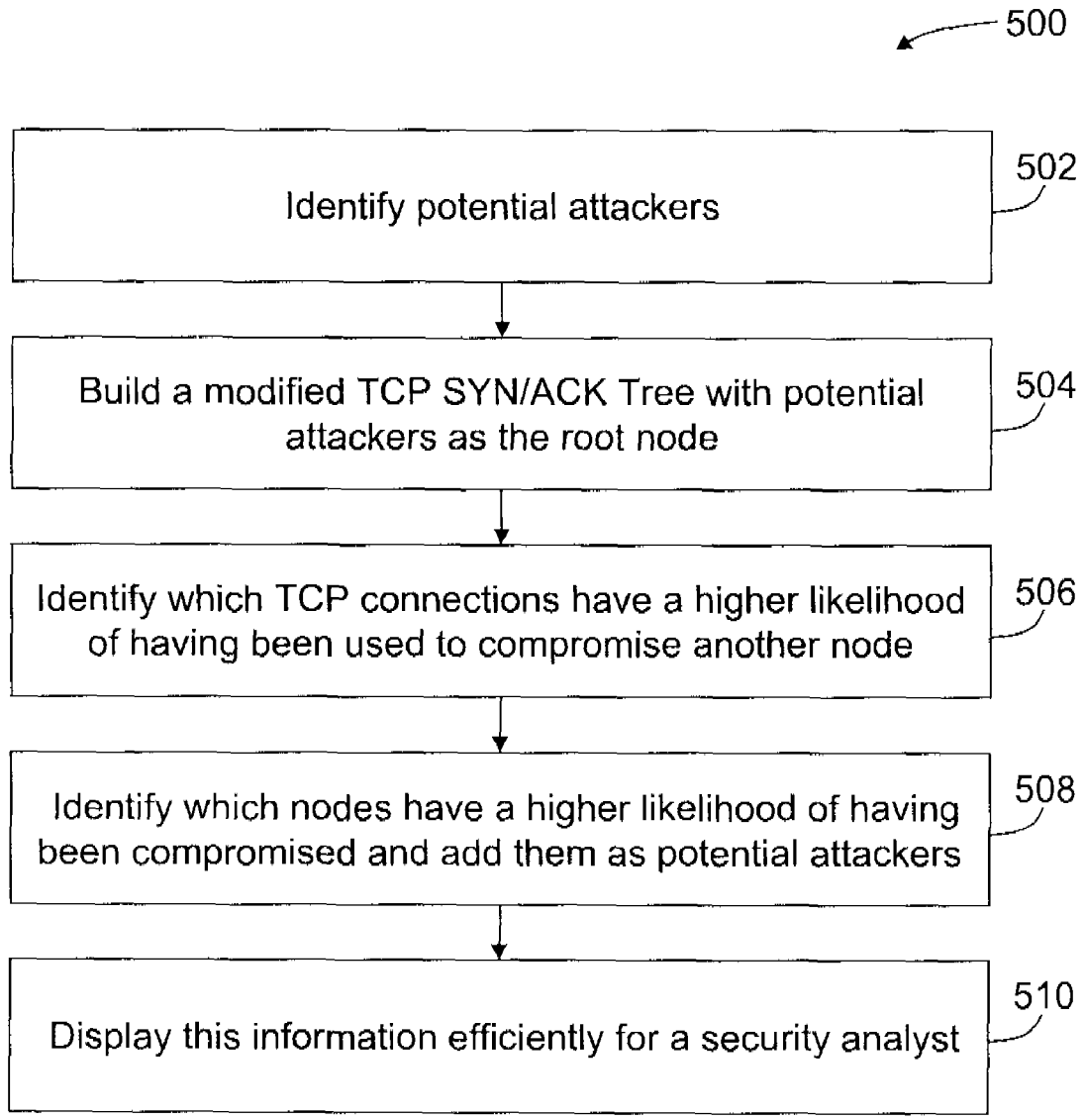
FIG. 10 is a flowchart showing a process for identifying and tracking a network attacker.

More specifically, FIG. 10 is a flowchart 500 showing a process for identifying and tracking a network attacker. Specifically, system 140 identifies 502 potential attackers and builds 504 a modified TCP SYN/ACK Tree with potential attackers as the root node. Continuing, system 140 identifies 506 which TCP connections have a higher likelihood of having been used to compromise another node and identifies 508 which nodes have a higher likelihood of having been compromised and add them as potential attackers. System 140 is configured to display 510 this information graphically for an analyst to review.

As an attacker scans a network looking for nodes to compromise, TCP SYN packets are typically sent to many ports on many nodes. Nodes that are running but have no service listening on that TCP port respond with a TCP RST packet, and nodes that do have a service listening respond with a TCP SYN/ACK packet, which indicates that the responding node is willing to establish a connection. It is the latter that is interesting in a TCP SYN/ACK Tree. Of the TCP packets sent by an attacker, only established connections are significantly useful to an attacker.

The TCP SYN/ACK tree does not track attacks made on the TCP/IP stack itself, or attacks based on protocols other than TCP. It is known within the art that the number of attack vectors available for these non-TCP types of attacks is much smaller by comparison, and so utilizing the TCP SYN/ACK tree is expected to catch most attacks on modern IP networks.

Figure 11:
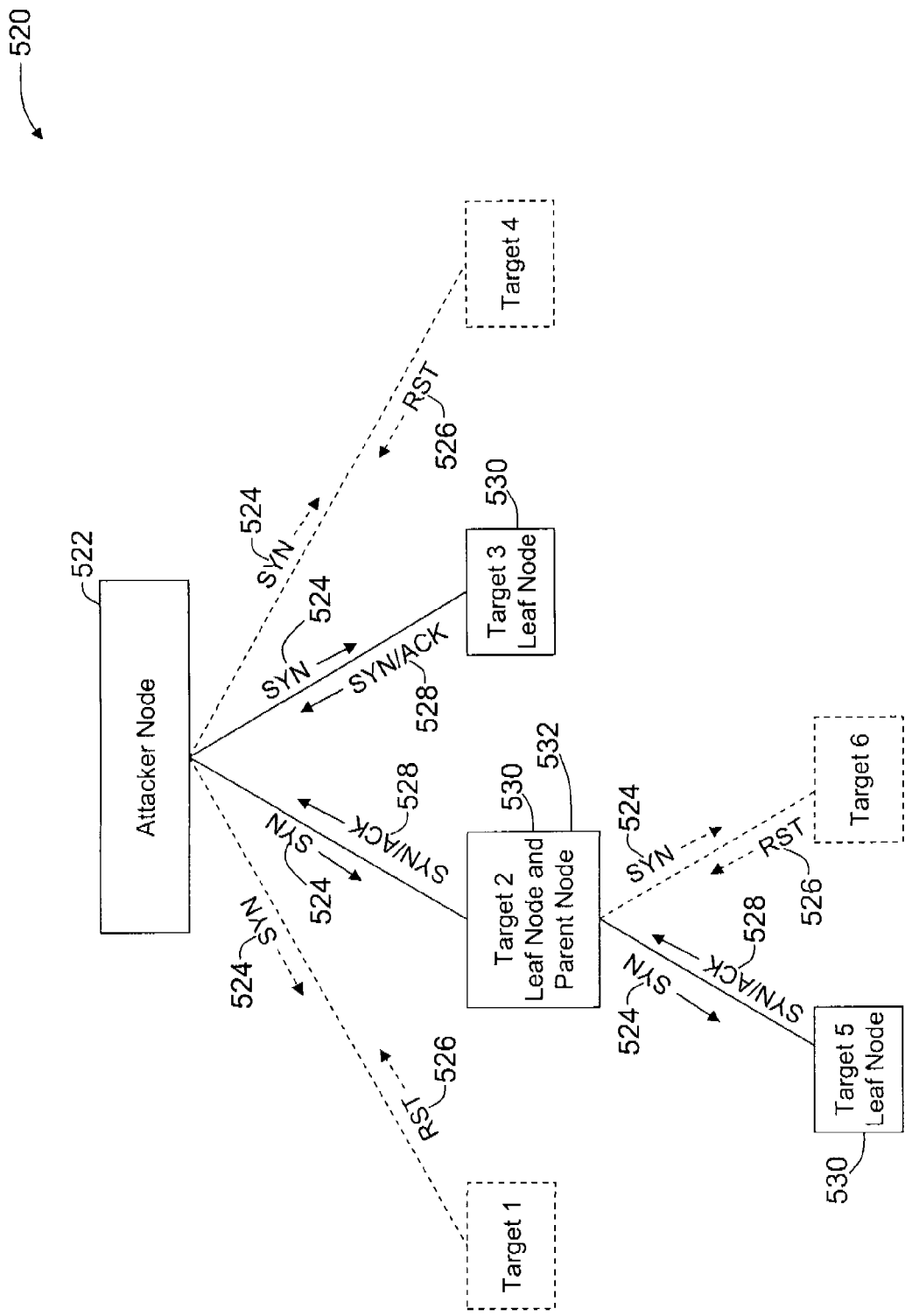
FIG. 11 is an example "TCP SYN/ACK Tree" diagram that represents the total nodes that an attacker could have possibly compromised via established TCP connections.

FIG. 11 shows an example "TCP SYN/ACK Tree" diagram 520 which represents the total nodes that an attacker could have possibly compromised via established TCP connections. The root node of a TCP SYN/ACK Tree 520 is an attacker node 522. As it sends out SYN requests 524, at least two responses are RST 526 and SYN/ACK 528. As mentioned above, if it receives SYN/ACK replies 528 from other nodes, those nodes are added as leaf nodes 530 to the attacker node 522. If a leaf node 530 in turn receives SYN/ACK packets 528 from other nodes, it becomes a parent node 532 with its own leaf nodes 530. In this manner, all nodes on the tree have the potential to have been compromised by an attacker via established TCP connections. In practice, a TCP SYN/ACK Tree 520 could become quite large, because any established TCP connection with a new node would add that node to the tree. The TCP SYN/ACK Tree 520 is therefore modified to change at least one of the parameters to limit the nodes on the tree to those that have a higher probability of being compromised and used as a launching point for further attacks.

This information might still be of interest to an analyst, but it is presented as such, and not necessarily as a possibly compromised system. For instance, if the attacker closes an established TCP connection without transferring any data to the other node, there was no opportunity to compromise the node, so the node should not be treated as if it were already potentially compromised. If only a small amount of data was transferred before the connection was closed, it is unlikely that an attacker is using that node for anything significant. Even if the node was compromised, little or no information was transferred from the node, and no significant remote control was attempted. Also, if the node responding with a SYN/ACK does not scan more than X other nodes on Y ports, it is less likely that the attacker is using it as a launch point for other attacks.

Additionally, the connection pattern of a potential attacker can be compared to the historical data stored in the conversation database of the IP Traffic Conversation Detection and Storage system 120 previously discussed. If the attacking node was recently added to the network, all traffic would be treated as potentially suspect. If a node was compromised at some point in recent history, then all traffic before that point would be treated as normal traffic, and traffic like it after that point would be removed from the SYN/ACK tree. Also, any non-normal non-TCP traffic from the conversation database can be added to the list of traffic being tracked to provide additional insight to the analyst.

Unfortunately, it is impossible to prove conclusively that a given packet or set of packets was created by an attacker. Therefore the reliability of any method (i.e. automated or manual) for determining candidates for new root (i.e. attacker) nodes will have some margin of error. Manual determination can have a distinct advantage over automated determination because the analyst has much more real-world experience to draw from than a simple algorithm. System 140 provides the analyst the ability to manually add a root node to the tracking database. Additionally, with the tools and historic data available through the SMIS system described herein, the analyst can direct the software to go back in time and map out the nodes that the potential attacker may have scanned in recent history.

One issue with manual determination is that it requires a human to perform an analysis of every situation. So automated determination, while not 100% reliable, is still beneficial because it can help narrow down the total number of possible situations to analyze. Because of this, system 140 monitors the network for nodes that are scanning a number of other nodes, and treats them as potential attackers until an analyst can make a determination.

A database tracking software program (e.g., db_tracking) monitors traffic on the network that happens during certain pre-defined intervals. For instance, if the software program is set to monitor five minute intervals, it processes the packet headers received during one five minute interval, and then five minutes later it processes the packet headers received in the next 5-minute interval.

Figure 12:
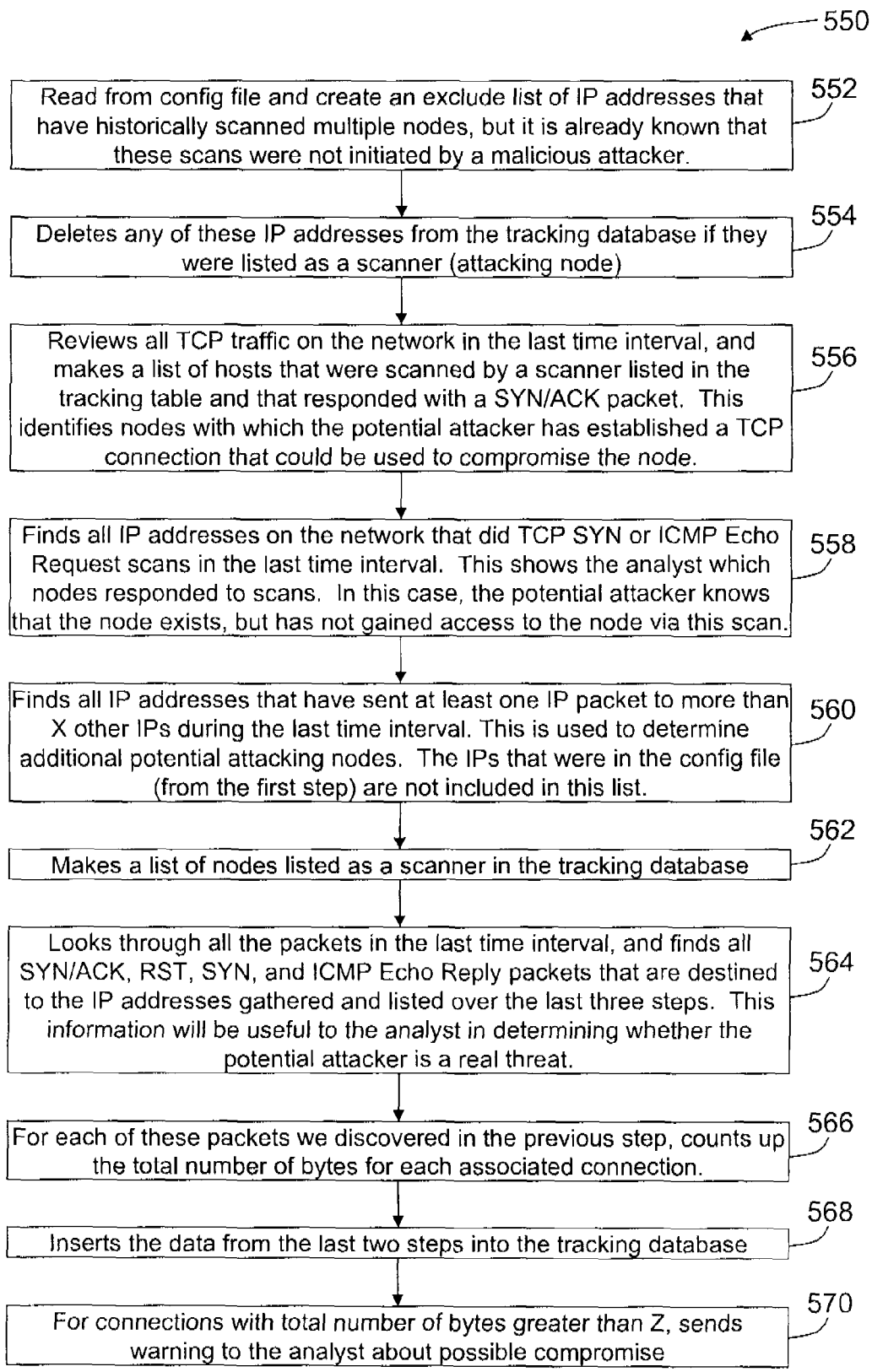
FIG. 12 is a flowchart illustrating the functions performed by the database tracking software program.

FIG. 12 is a flowchart 550 illustrating the functions performed by the database tracking software program. In the illustrated embodiment, the program reads 552 from a CONFIG file and creates an exclude list of IP addresses that have historically scanned multiple nodes, but the scans are known not to be initiated by a malicious attacker. The program then deletes 554 any of these IP addresses from the tracking database if they were listed as a scanner (i.e. attacking node).

The program then reviews 556 all TCP traffic on the network in the last time interval, and makes a list of hosts that were scanned by a scanner listed in the tracking table and that responded with a SYN/ACK packet. This review 556 identifies nodes with which the potential attacker has established a TCP connection that could be used to compromise the node. All IP addresses on the network that did TCP SYN or ICMP Echo Request scans in the last time interval are then found 558, showing the analyst which nodes responded to scans. In this case, the potential attacker knows that the node exists, but has not gained access to the node via this scan.

The program also finds 560 all IP addresses that have sent at least one IP packet to more than a predetermined number of other IPs during the last time interval. This finding 560 is used to determine additional potential attacking nodes. The IPs that were in the CONFIG file are not included in this list.

Continuing, a list of nodes listed as a scanner in the tracking database is made 562 and the program looks 564 through all the packets in the last time interval, and finds all SYN/ACK, RST, SYN, and ICMP Echo Reply packets that are destined to be sent to the IP addresses gathered in the last two steps. This information will be useful to the analyst in determining whether the potential attacker is a real threat.

For each of the SYN/ACK, RST, SYN, and ICMP Echo Reply packets found, system 140 counts 566 up the total number of bytes for each associated connection and then inserts 568 the data from the last two steps into the tracking database. For connections with total number of bytes greater than a predetermined number, system 140 sends 570 warnings to the analyst about possible compromise.

FIG. 13 shows an example user interface 580 used for displaying the information contained in the tracking database. The user interface 580 allows the analysts to view all data in the tracking database. Additionally, the analysts can search the database by start time 582, end time 583, IP protocol 584, scanner IP address 585, scanned IP address 586, TCP port 587, kilobytes transferred 588, or packet type 589 (i.e., RST, SYN/ACK, etc.). For the kilobytes transferred filter, the tool associated with user interface 580 displays only the TCP connections that contained more than a specified number of bytes, representing the connections that an attacker may have used to compromise the target system.

Each row 592 in the table 590 represents a single TCP connection attempt. A timestamp 593 of the initial packet is displayed, along with both of the scanner 594 and scanned 595 IP addresses, port number 596, packet type 597, and total kilobytes transferred 598. There are also buttons on each row 592 that allow the analyst to instantly filter the query on the IP address of the scanner 600 ("Track Scanner") or scanned 602 ("Track Scanned") system, or download packet headers for the associated connection 604 ("GetHeaders"). In one embodiment, when an operator causes a cursor on a computer screen to "touch" these buttons, they change color to indicate that they can be selected by the user.

Once an analyst has access to the list of nodes in a SYN/ACK tree, it is much easier to determine which nodes have been compromised. Through user interface 580, an analyst can easily determine which nodes have a higher probability of having been compromised. In addition to tracking TCP SYN/ACK packets, other provided information is which nodes responded to scans from an attacker that didn't result in an established TCP connection. This information lets an attacker know that a node is running, even if the attack was not yet successful. In one embodiment, instead of removing node from the tracking table, the node is marked as false positive.

V. System for Passive Collecting, Tracking, and Display of Near-Real-Time Multicast Data The SMIS component system for passive collecting, tracking and display of near-real-time multicast data 150 passively analyzes multicast packets to determine all of the multicast groups in the network, including the locations of the originating host and the destination, instead of performing an analysis through active participation or query-response behavior. System 150 utilizes the packet header data obtained by the IP Packet Header Collection and Storage system 110 previously discussed.

One result is a computer-based method for depicting the participating devices of a multicast group based on the transmit and the receive activities of the devices in a computer network. The method includes extracting a single instance of each unique packet header associated with a plurality of multicast packets, the multicast packets having been transmitted across the computer network over a predefined period of time as described above with respect to system 110. The method continues by calculating a number of bytes transferred for each source IP to destination IP multicast tuple from the extracted packet headers, determining a location of the source IP address and a bandwidth associated with the source IP address from the extracted headers, determining a location of the devices detecting the packets and a bandwidth associated with each of the destination IP addresses, and providing a display of all multicast traffic, the multicast traffic summarized in a selectable list.

Figure 14:
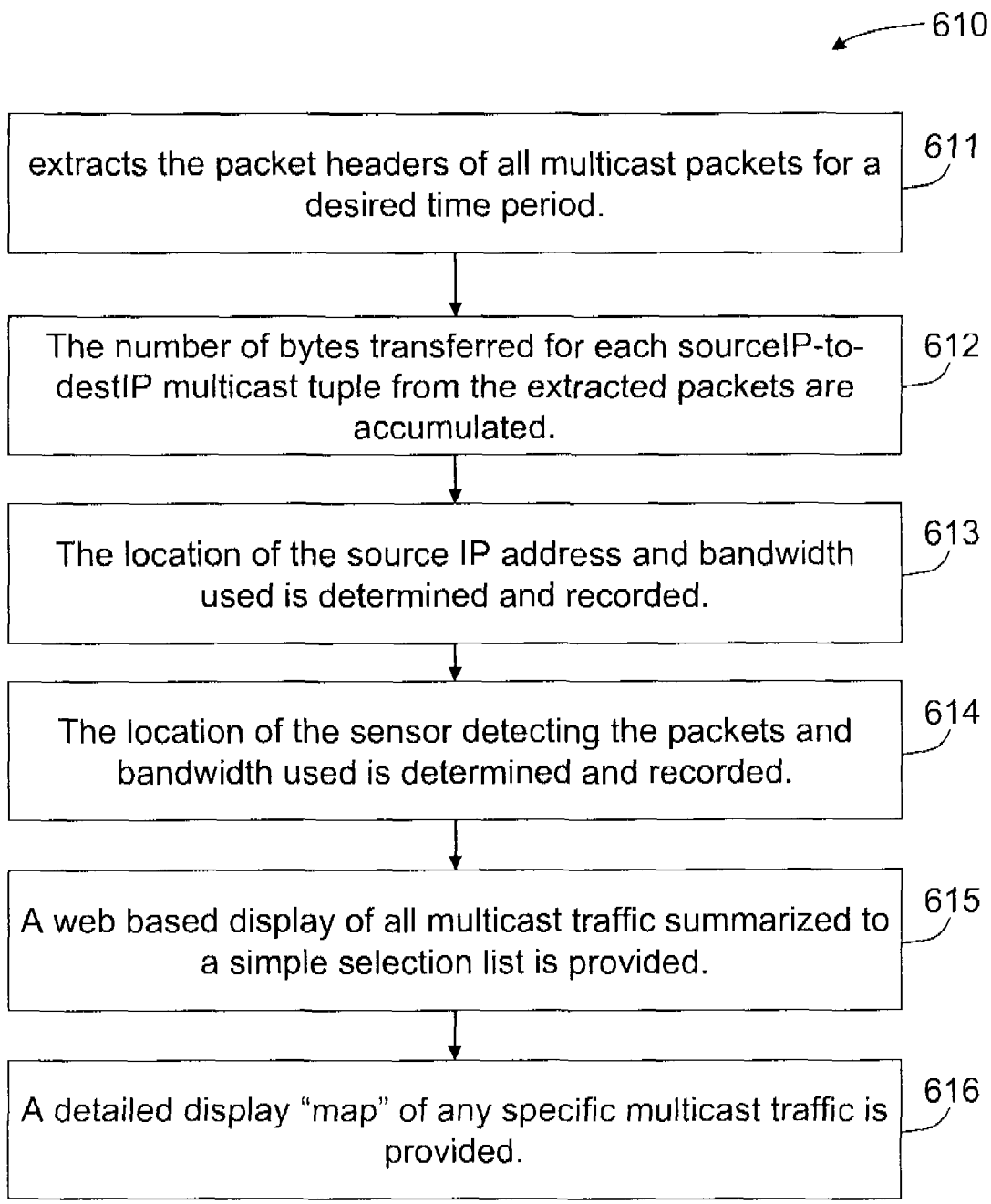
FIG. 14 is a flowchart illustrating a process for detection and display of multicast groups.

More specifically, FIG. 14 is a flowchart 610 showing a process for detection and display of multicast groups. System 150 provides for observation of multicast groups on a network via passive detection, allowing a user, e.g. a network manager or operations center, to realize the multicast group traffic passing through the user's network in near-real-time and the destination of the multicast groups.

Referring to flowchart 610, system 150 extracts 611 the packet headers of all multicast packets for a desired time interval. To determine if a specific packet is a multicast packet, the destination IP address must be in the range of 224.0.0.0/4 (i.e. 224.0.0.0 through 239.255.255.255). The selected data includes at least one of a source IP address to determine the multicast publisher, a destination IP address to determine the multicast group, a sensor detecting the packet to help determine the sites subscribing to the group, a first and last time stamp observed for these packets within the desired time interval, and a total number of bytes represented by this header to determine bandwidth used.

The number of bytes transferred for each source IP to destination IP multicast tuple from the extracted packets are accumulated 612. To calculate the number of bytes transferred for each source IP to destination IP-on-sensor multicast tuple from the extracted packets, the bytes observed for each unique source IP to destination IP-on-sensor tuple are summed together.

The location of the source IP address and bandwidth used is determined and recorded 613. The determining algorithm requires a type of lookup function/table that provides a method to find a site location given an IP address. The location might be a city, building, lab, or area depending on how accurate the user wants the final displayed map to be. Divide the number of bytes by the time difference between the first and last time stamp for these packets to get the amount of average bandwidth used. The unique location indicator is written to a database or file along with the source IP address, destination IP address which is also the Multicast destination IP, and the calculated bandwidth usage.

Continuing, the location of the sensor detecting the packets and bandwidth used is determined and recorded 614. The nature of Sparse Mode multicast packets is such that they will arrive at locations, e.g. city, building, lab, or area, only if at least one device in that location has subscribed to the multicast group. Since there is no guarantee that the passive detection devices can see all the IGMP (Internet Group Management Protocol) Membership Reports, only the current passively detected packets passing through a given location are used. With the source and destination IP addresses in this packet the receiving site can be lined up with the sending site determined as described above. The unique location indicator is written to a database or file log with the source IP address, destination IP address (e.g. which is also the Multicast group address), and the calculated bandwidth usage.

A web based display of all multicast traffic summarized to a simple selection list is provided 615. Users can select from the list to display more detailed information about the individual multicast group. By reviewing the database or file holding the multicast data found as described above, a consolidated list of multicast groups can be generated. This list based on the destination IP address (e.g. which is also the Multicast destination IP) and the calculated bandwidth usage.

In addition, a detailed display "map" of a specific multicast traffic is provided 616. If the user has selected to display to the detailed display "map" a specific multicast group, the source IP information and the destination device information is combined to form a logical map of the multicast group selected. Sources and subscribers can be displayed, as well as the amount of bandwidth being used by each source.

FIG. 15 is a sample web based display 620 showing a list of the observed multicast streams captured within the previous 15 minutes. The interface elements shown are a multicast channel list 622 along with the respective summed number of megabits per second 624 used. As described above, a specific multicast channel 626 can be selected from the list to show more details in a multicast map display.

Figure 16:
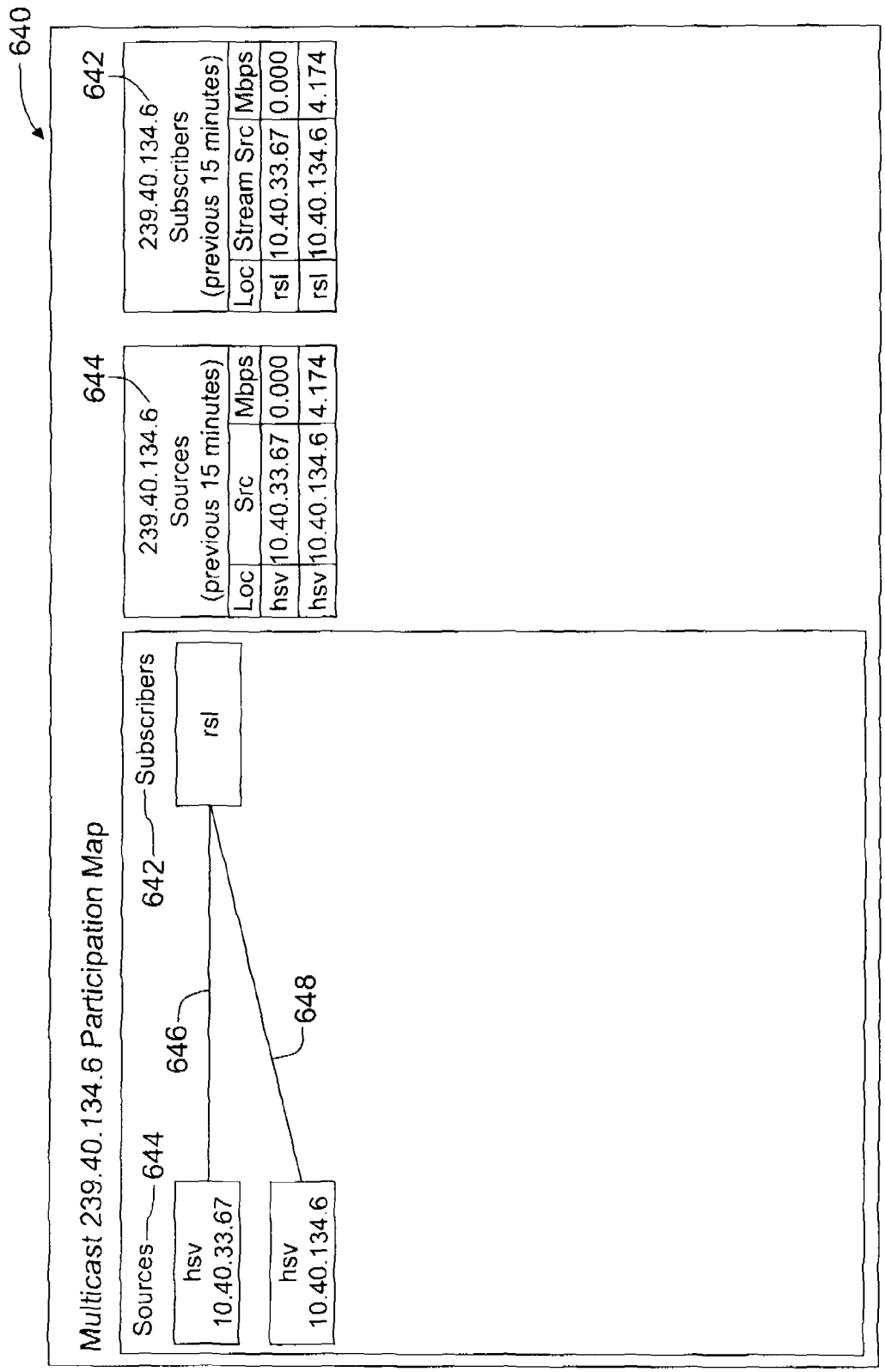
FIG. 16 is a detailed display of a logical map of a selected multicast channel.

FIG. 16 is a detailed display 640 of a logical map of the selected multicast channel 626, as shown in FIG. 14. Display 640 illustrates the connection between Subscribers 642 and Sources 644, indicating the data transmitting lines 646 and the data receiving lines 648.

In use, as an example, the network analyst uses this data to passively monitor specific multicast stream without becoming a participant in the multicast stream. From the detailed display 640, the analyst can determine who is and is not a participant of the specific multicast stream, whether or not they are receiving/transmitting data, and whether they are receiving/transmitting an amount of data common to that used for an audio stream, video stream or nothing at all.

This automatic and continuous processing of the data reduces the human interaction time. In passively monitoring the multicast streams, no extra loads or changes are added to the existing network. The multicast data is stored in an accessible manner, which can be manipulated, allowing for other forms of analysis. The data is displayed in a graphical manner for improved comprehension and understanding. Also, since system 150 is continuously monitoring, it does not require special setup or activation after a multicast anomaly has occurred.

It is generally agreed that the most expensive part of any security monitoring effort is the human analyst's attention. The automation of SMIS systems described herein allows the analyst to optimize the attention of the human-in-the-loop by directing that attention to the most critical item that needs attention at any moment in time, and then optimize the process of investigating that item.

The automation of the SMIS also substantially eliminates typing or retyping the relevant details. And since the SMIS stores all of the packets on the network, it doesn't need to start a new capture and risk not seeing the packets again—it just looks up the packets that actually triggered the initial event. These features also make it easy for an analyst to know exactly what triggered an event so he/she can write a filter or change the rule in a way that doesn't filter out too much, as well as know how to fix a rule that is detecting something incorrectly.

Along with being a tool for network security analysts, the SMIS can be utilized by non-security-related software designers since the header data analysis can be useful for network management, statistical traffic analysis, and troubleshooting tools. Together, the many tools, concepts, and components in the SMIS provide the capability to make security analysis feasible, efficient, and timely in any environment from the smallest to the largest environment, government or commercial.

The present disclosure may be described in a general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The present disclosure may be practiced in a variety of system configurations, including hand-held devices, consumer electronics, general-purpose computers, more specialty computing devices, and the like. The present disclosure may also be practiced in distributed computing environments where tasks are performed by remote-processing devices that are linked through a communications network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples and equivalents are intended to be within the scope of the claims.

What is claimed is:

1. A computer-based method for detecting anomalies in the traffic passing through an internet protocol (IP) network, said method comprising:

extracting, from a database, a single instance of each unique packet header associated with a plurality of IP-to-IP packets, the IP-to-IP packets having been transmitted across the IP network over a predefined period of time;

analyzing by a computer the packet headers to identify anomalous conversations based on at least one of a conversation uniqueness, a time of week uniqueness, and a data quantity uniqueness; and providing by the computer alerts corresponding to detected anomalous conversations.

2. The method of claim 1, wherein said analyzing the packet headers to identify anomalous conversations based on a conversation uniqueness comprises determining whether a particular conversation has been conducted on the IP network over a historical and statistically relevant period based on an IP-to-IP-on-Port conversation tuple.

3. The method of claim 2, wherein said determining whether a particular conversation has been conducted on the IP network over a historical and statistically relevant period comprises determining whether the IP-to-IP-on-Port conversation tuple was previously stored in the database.

4. The method of claim 1, wherein said analyzing the packet headers to identify anomalous conversations based on a time of week uniqueness comprises determining whether a particular conversation has been conducted on the IP network in a specific hour of the week over a historical and statistically relevant period.

5. The method of claim 4, wherein said determining whether a particular conversation has been conducted on the IP network in a specific hour of the week over a historical and statistically relevant period comprises determining whether the IP-to-IP-on-Port conversation tuple was previously conducted at the specific hour of the week.

6. The method of claim 1, wherein said analyzing the packet headers to identify anomalous conversations based on a data quantity uniqueness comprises determining whether a particular conversation conducted on the IP network has used a statistically different amount of bandwidth in a given hour of the week over a historical and statistically relevant period.

7. The method of claim 6, wherein said determining whether a particular conversation conducted on the IP network has used a statistically different amount of bandwidth comprises:

summing the number of bytes transferred for the particular conversation in the last relevant period; and comparing the sum against an average bandwidth extracted from the database.

8. The method of claim 1, wherein said providing alerts corresponding to detected anomalous conversations comprises outputting relevant security events based on the analysis of the packet headers to a security event management system.

9. The method of claim 1 further comprising filtering out known frequently false alarming IP addresses and ports.

10. The method of claim 9, wherein said filtering out known frequently false alarming IP addresses and ports comprises at least one of:

filtering out all conversations between specific pair of IP addresses;

filtering out all conversations where a specific IP and port are found;

filtering out all conversations where a single IP address is involved; and filtering out all conversations that occur on a specific port.

11. The method of claim 1, wherein said extracting a single instance of each unique packet header associated with a plurality of IP-to-IP packets, the IP-to-IP packets having been transmitted across the IP network over a predefined period of time comprises:
    selecting all of the conversation records for the predefined time period where the selection data includes at least one of both IP addresses, the Internet protocol, the port, and the number of bytes recorded; and
    summing the selected data by the conversation tuple IP-to-IP-on-Port.

12. A system, comprising:
    a plurality of communicatively coupled computers configured to communicate via an internet protocol (IP) across a computer network; and
    a database containing a single instance of each unique packet header associated with a plurality of IP-to-IP packets, the IP-to-IP packets having been transmitted across the computer network over a predefined period of time, one of said computers programmed to:
        analyze the packet headers in said database to identify anomalous conversations based on at least one of a conversation uniqueness, a time of week uniqueness, and a data quantity uniqueness; and
        provide at least one alert to a network user, the at least one alert corresponding to detected anomalous conversations.

13. The system of claim 12, wherein to analyze the packet headers in said database to identify anomalous conversations, the one of said computers is programmed to determine whether a particular conversation has been conducted on the IP network over a historical and statistically relevant period based on an IP-to-IP-on-Port conversation tuple.

14. The system of claim 13, wherein to determine whether a particular conversation has been conducted on the IP network over a historical and statistically relevant period, the one of said computers is programmed to determine whether the IP-to-IP-on-Port conversation tuple was previously stored in the database.

15. The system of claim 12, wherein to analyze the packet headers to identify anomalous conversations based on a time of week uniqueness, the one of said computers is programmed to determine whether a particular conversation has been conducted on the IP network in a specific hour of the week over a historical and statistically relevant period.

16. The system of claim 15, wherein to determine whether a particular conversation has been conducted on the IP network in a specific hour of the week over a historical and statistically relevant period, the one of said computers is programmed to determine whether the IP-to-IP-on-Port conversation tuple was previously conducted at the specific hour of the week.

17. The system of claim 12, wherein to analyze the packet headers to identify anomalous conversations based on a data quantity uniqueness, the one of said computers is programmed to determine whether a particular conversation conducted on the IP network has used a statistically different amount of bandwidth in a given hour of the week over a historical and statistically relevant period.

18. The system of claim 17, wherein to determine whether a particular conversation conducted on the IP network has used a statistically different amount of bandwidth, the one of said computers is programmed to:
    sum the number of bytes transferred for the particular conversation in the last relevant period; and
    compare the sum against an average bandwidth extracted from the database.

19. The system of claim 12, wherein to provide alerts corresponding to detected anomalous conversations, the one of said computers is programmed to output relevant security events based on the analysis of the packet headers to a security event management system.

20. The system of claim 12, wherein the one of said computers is programmed to filter out known frequently false alarming IP addresses and ports through at least one of:
    filter out all conversations between specific pair of IP addresses;
    filter out all conversations where a specific IP and port are found;
    filter out all conversations where a single IP address is involved; and
    filter out all conversations that occur on a specific port.

21. The system of claim 12, wherein to extract a single instance of each unique packet header associated with a plurality of IP-to-IP packets, the IP-to-IP packets having been transmitted across the IP network over a predefined period of time, the one of said computers is programmed to:
    select all of the conversation records for the predefined time period where the selection data includes at least one of both IP addresses, the Internet protocol, the port, and the number of bytes recorded; and
    sum the selected data by the conversation tuple IP-to-IP-on-Port.

22. A method for detecting anomalies in network traffic, said method comprising:
    receiving a single instance of each unique packet header associated with a plurality of IP-to-IP packets;
    analyzing the packet headers by a computer to identify anomalous conversations based on at least one of:
        a determination, based on an IP-to-IP-on-Port conversation tuple, of whether a particular conversation has been conducted on the IP network over a historical and statistically relevant period,
        a determination whether a particular conversation has been conducted on the IP network in a specific hour of the week over a historical and statistically relevant period, and
        a determination whether a particular conversation conducted on the IP network has used a statistically different amount of bandwidth in a given hour of the week over a historical and statistically relevant period; and
    providing alerts corresponding to detected anomalous conversations.

* * * * *